(12) United States Patent
Kesselman

(10) Patent No.: US 8,271,455 B2
(45) Date of Patent: Sep. 18, 2012

(54) STORING REPLICATION REQUESTS FOR OBJECTS IN A DISTRIBUTED STORAGE SYSTEM

(75) Inventor: Alexander Kesselman, Sunnyvale, CA (US)

(73) Assignee: Google, Inc., Mountain View, CA (US)

( * ) Notice: Subject to any disclaimer, the term of this patent is extended or adjusted under 35 U.S.C. 154(b) by 15 days.

(21) Appl. No.: 13/024,186

(22) Filed: Feb. 9, 2011

(65) Prior Publication Data

US 2011/0196834 A1      Aug. 11, 2011

Related U.S. Application Data

(60) Provisional application No. 61/302,908, filed on Feb. 9, 2010.

(51) Int. Cl.
*G06F 7/00* (2006.01)
(52) U.S. Cl. ........ 707/679; 707/770; 707/812; 707/969; 707/974
(58) Field of Classification Search .................. None
See application file for complete search history.

(56) References Cited

U.S. PATENT DOCUMENTS

| | | |
|---|---|---|
| 6,728,751 B1 | 4/2004 | Cato et al. |
| 7,107,419 B1 | 9/2006 | Ghemawat et al. |
| 7,293,154 B1 | 11/2007 | Karr et al. |
| 7,320,059 B1 | 1/2008 | Armangau et al. |
| 7,450,503 B1 * | 11/2008 | Ginjpalli et al. ........... 370/230.1 |
| 7,647,329 B1 | 1/2010 | Fischman et al. |
| 7,653,668 B1 | 1/2010 | Shelat et al. |
| 7,778,972 B1 | 8/2010 | Cormie et al. |
| 8,099,388 B2 * | 1/2012 | Shen et al. .................. 707/636 |
| 2003/0149709 A1 | 8/2003 | Banks |
| 2005/0198359 A1 | 9/2005 | Basani et al. |
| 2006/0112140 A1 | 5/2006 | McBride et al. |
| 2007/0050415 A1 | 3/2007 | Armangau et al. |
| 2007/0078901 A1 | 4/2007 | Satou et al. |
| 2007/0156842 A1 * | 7/2007 | Vermeulen et al. ........... 709/217 |
| 2008/0027884 A1 | 1/2008 | Boutault |

(Continued)

FOREIGN PATENT DOCUMENTS

EP     1 860 542 A2     11/2007

OTHER PUBLICATIONS

"How Index Building Works", Ryan Barett, Nov. 24, 2008.*

(Continued)

*Primary Examiner* — Fred I Ehichioya
*Assistant Examiner* — Hasanul Mobin
(74) *Attorney, Agent, or Firm* — Morgan, Lewis & Bockius LLP

(57) ABSTRACT

A system and method for storing replication requests for objects in a distributed storage system is provided. A plurality of replication requests for objects stored on storage devices in a distributed storage system is received. Respective row keys are generated for respective replication requests in the plurality of replication requests based on parameters of the respective replication requests. The respective row keys include respective globally-determined priorities for the respective replication requests that facilitate sorting of the respective replication requests by priority. The respective replication requests are stored in respective records of a distributed database using the respective row keys, wherein the respective records of the distributed database are distributed across a plurality of nodes of the distributed database.

24 Claims, 20 Drawing Sheets

U.S. PATENT DOCUMENTS

| | | |
|---|---|---|
| 2009/0083342 A1 | 3/2009 | Tomic et al. |
| 2009/0265519 A1 | 10/2009 | Moore et al. |
| 2009/0271412 A1 | 10/2009 | Lacapra et al. |
| 2009/0327602 A1 | 12/2009 | Moore et al. |
| 2010/0094981 A1 | 4/2010 | Cordray et al. |

OTHER PUBLICATIONS

Google Inc., PCT/US2011/024246, Feb. 9, 2011, International Search Report and Written Opinion mailed Apr. 26, 2011, 9 pgs.

Google Inc., PCT/US2011/024247, Feb. 9, 2011, International Search Report and Written Opinion mailed Sep. 23, 2011, 15 pgs.

Google Inc., PCT/US2011/024249, Feb. 9, 2011, International Search Report and Written Opinion mailed Apr. 26, 2011, 10 pgs.

Chang et al., "Bigtable: A Distributed Storage System for Structured Data," OSDI, Oct. 31, 2006, 1-14 pgs.

Ghemawat et al., "The Google File System," SOSP' 03, Oct. 19-22, 2003, 15 pgs.

Google Code, "Protocol Buffers Language Guide," Jul. 11, 2008, 16 pgs. http://code.google.com/apis/protocolbuffers/docs/proto.html.

Korn et al., "The VCDIFF Generic Differencing and Compression Data Format," RFC 3284, Jun. 2002, 1-29 pgs.

\* cited by examiner

Exemplary Server Allocation

| Task / Function | Typical Number of Servers at an Instance |
|---|---:|
| Blobmaster | 10 |
| Bitpusher | 100 |
| BigTable Servers | 50 |
| File System Servers | 1000 |
| Tape Servers | 10 |
| Tape Master | 5 |
| Replication Management | 10 |
| Quorum Clock Server | 5 |

Figure 5

STORING REPLICATION REQUESTS FOR OBJECTS IN A DISTRIBUTED STORAGE SYSTEM

PRIORITY

This application is claims priority to U.S. Provisional Application Ser. No. 61/302,908, filed Feb. 9, 2010, entitled "System and Method for Replicating Objects in a Distributed Storage System, which is incorporated by reference herein in its entirety.

TECHNICAL FIELD

The disclosed embodiments relate generally to replicating objects in a distributed storage system.

BACKGROUND

The enterprise computing landscape has recently undergone a fundamental shift in storage architectures in which the central-service architecture has given way to distributed storage systems. Distributed storage systems built from commodity computer systems can deliver high performance, availability, and scalability for new data-intensive applications at a fraction of cost compared to monolithic disk arrays. To unlock the full potential of distributed storage systems, data is replicated across multiple instances of the distributed storage system at different geographical locations, thereby increasing availability and reducing network distance from clients.

In a distributed storage system, objects are dynamically created, and deleted in different instances of the distributed storage system. However, different replication requests may have different priorities. It is important to execute replication requests in priority order so as to replicate the more important objects first. For example, a newly uploaded object has just one replica. Thus, it is more important to create replicas of the new object before creating replicas of existing objects that already has a plurality of replicas in order to minimize the probability of data loss in the new object. Another example is a video that becomes a hit over night. In this case, the number of replicas of the video needs to be increased as soon as possible in order to handle the increased demand. Therefore, it is desirable to properly prioritize replication requests and execute them in a timely fashion while sustaining very high loads.

One technique for prioritizing replication requests is to place the replication requests in a priority queue. Typically, a priority queue is implemented as an in-memory sorting data structure that returns the element from the queue that has the highest priority. This technique works reasonably well for small-scale systems. However, for large-scale systems such as distributed storage systems, all elements of the priority queue cannot fit into main memory. Another technique is to use external memory sorting algorithms. However, external memory sorting algorithms can impose long delays and typically require centralized coordination. Furthermore, de-queuing and processing of elements can become a bottleneck as well.

Thus it is desirable to system and method for replicating objects in a distributed storage system without the aforementioned problems.

SUMMARY

To address the aforementioned deficiencies, some embodiments provide a system, a computer-readable storage medium including instructions, and a computer-implemented method for inserting an object into a distributed database. An object to be inserted into a priority queue is received, wherein the object includes a unique identifier and a priority. Next, an index for the object is generated. A row name for the object is then generated based on the index, the priority of the object, and the unique identifier of the object, wherein a lexicographical order of the row name for a higher priority object is smaller than the lexicographical order of the row name for a lower priority object. The object is then inserted into a row of a distributed database using the row name.

In some embodiments, the index is generated by applying a hashing function to the unique identifier.

In some embodiments, the row name for the object is generated based on the index and the priority of the object as follows. The priority of the object is converted to a string, wherein a lexicographical order of the string for a higher priority object is smaller than the lexicographical order of the string for a lower priority object. The row name for the object is then generated by concatenating the index, the string corresponding to the priority of the object, and the unique identifier of the object.

In some embodiments, the hashing function is selected from the group consisting of SHA-1 and MD5.

In some embodiments, the object is a replication request to replicate data in a distributed storage system.

In some embodiments, the index is a shard index.

In some embodiments, a respective index is received. Next, the distributed database is scanned to identify objects in the distributed database that have row names including the respective index. The identified objects are sorted based on the row names so that the identified objects are sorted in priority order. The sorted objects are then inserted into a priority queue.

In some embodiments, the priority queue is a replication queue.

Some embodiments provide a system, a computer-readable storage medium including instructions, and a computer-implemented method for operating on objects stored in a distributed database in priority order. Rows of a distributed database that correspond to an index are identified. Next, the identified rows are sorted lexicographically based on row names of the identified rows, wherein the sorted rows are ordered by priorities of objects corresponding to the sorted rows. The objects corresponding to the sorted rows are then operated on in priority order.

In some embodiments, the objects are replication requests for replicating data in a distributed storage system. In these embodiments, the objects corresponding to the sorted rows are operated on in priority order by executing the replication requests in priority order to replicate data in the distributed storage system.

In some embodiments, the computer system is a tablet server. Note that a tablet server is database server that is responsible for a specific range of rows in a distributed database.

In some embodiments, the distributed storage system includes a plurality of tablet servers.

In some embodiments, a respective tablet server in the plurality of tablet servers operates on respective objects corresponding to a respective index.

In some embodiments, a respective row name is based on a respective index, a respective priority, and a respective unique identifier of a respective object.

Some embodiments provide a system, a computer-readable storage medium including instructions, and a computer-implemented method for storing replication requests for objects in a distributed storage system. A plurality of replication requests for objects stored on storage devices in a distributed storage system is received. Next, respective row keys for respective replication requests in the plurality of replication requests are generated based on parameters of the respective replication requests, wherein the respective row keys include respective globally-determined priorities for the respective replication requests that facilitate sorting of the respective replication requests by priority. The respective replication requests are then stored in respective records of a distributed database using the respective row keys, wherein the respective records of the distributed database are distributed across a plurality of nodes of the distributed database.

In some embodiments, the parameters for a respective replication request include a replication key corresponding to a respective object, a list of chunks of the respective object, a replication identifier corresponding to the respective replication request; and a globally-determined profit value corresponding to the respective replication request, wherein the globally-determined profit value is based on a metric corresponding to a benefit of performing the respective replication request minus a metric corresponding to a cost of performing the respective replication request.

In some embodiments, a respective row key for the respective replication request is generated based on the replication key of the respective replication request, the profit value of the respective replication request, and the replication identifier of the respective replication request.

In some embodiments, a respective row key for the respective replication request is generated based on a hashed version of the replication key of the respective replication request, the profit value of the respective replication request, and the replication identifier of the respective replication request.

In some embodiments, the replication key includes a user identifier, a quality of service metric, an identifier for a source storage device in the distributed storage system, and an identifier for a destination storage device in the distributed storage system.

In some embodiments, the source storage device and the destination storage device are located in separate and distinct instances of the distributed storage system.

In some embodiments, a globally-determined priority of the respective replication request is based on the globally-determined profit value for the respective replication request.

In some embodiments, the plurality of replication requests is received from a location assignment daemon is configured to generate replication requests globally across instances of the distributed storage system based at least in part on a current state of the distributed storage system and replication policies for objects in the distributed storage system.

In some embodiments, the location assignment daemon is located on a second computer system that is separate and distinct from the computer system.

In some embodiments, the receiving, the generating, and the storing are performed at a respective instance of the distributed storage system.

In some embodiments, the distributed storage system includes a plurality of instances of the distributed storage system.

In some embodiments, a respective replication request is executable to add a replica of the respective object at an instance of the distributed storage system.

In some embodiments, a respective object is a binary large object (blob).

Some embodiments provide a system, a computer-readable storage medium including instructions, and a computer-implemented method for executing replication requests for objects in a distributed storage system. A replication queue is identified from a plurality of replication queues corresponding to a replication key, wherein the replication key includes information related to at least a source storage device in a distributed storage system at which objects are located and a destination storage device in the distributed storage system to which the objects are to be replicated. A distributed database is scanned using an identifier of the replication queue to produce a list of replication requests corresponding to the replication queue, wherein the list of replication requests is sorted by globally-determined priorities of the replication requests that are included in row keys corresponding to records of the distributed database for the replication requests in the list of replication requests, and wherein the records of the distributed database are distributed across a plurality of nodes of the distributed database. Replication requests in the list of replication requests are executed in priority order. Replication requests from the distributed database are deleted only when the replication requests are complete.

In some embodiments, replication requests in the replication queue have the same replication key.

In some embodiments, the identifier for the replication queue is a replication key.

In some embodiments, the replication requests corresponding to the replication queue are executed in priority order by transmitting the replication requests to a task server for execution, wherein the task server is separate and distinct from the computer system.

In some embodiments, a location assignment daemon is configured to generate replication requests globally across instances of the distributed storage system based at least in part on a current state of the distributed storage system and replication policies for objects in the distributed storage system.

In some embodiments, the identifying, the scanning, the executing, and the deleting are performed for each replication queue in the plurality of replication queues.

Some embodiments provide a system, a computer-readable storage medium including instructions, and a computer-implemented method for executing replication requests for objects in a distributed storage system. A plurality of replication requests for objects in a distributed storage system is received. The plurality of replication requests are partitioned into one or more replication queues, wherein a respective replication queue includes replication requests that have a respective replication key, wherein the respective replication key includes information related to at least a respective source storage device at which a respective object is located and a respective destination storage device to which the respective object is to be replicated. For each replication queue, the replication requests in the replication queue are sorted based on priorities of the replication requests. Commands to execute a highest priority request in each replication queue are issued. When a respective replication request is completed, the respective replication request is deleted from the replication queue.

In some embodiments, commands to update metadata for a respective object corresponding to the respective replication request are issued to a blobmaster, wherein the blobmaster is configured to maintain metadata for objects in the distributed storage system.

In some embodiments, further comprising for each replication queue, repeating the issuing and deleting until the replication queue is empty.

In some embodiments, for each replication queue, the issuing and deleting are repeated until a plurality of new replication requests is received from the location assignment daemon.

In some embodiments, each replication queue is handled by a respective task server that is separate and distinct from the computer system.

In some embodiments, the commands are issued to a bitpusher module configured to copy chunks of objects from source storage devices to destination storage devices.

In some embodiments, the bitpusher module is located on a second computer system that is separate and distinct from the computer system.

In some embodiments, the plurality of replication requests is received from a location assignment daemon configured to generate replication requests based at least in part on a current state of the distributed storage system and replication policies for objects in the distributed storage system.

In some embodiments, the location assignment daemon is located on a third computer system that is separate and distinct from the computer system.

In some embodiments, the replication key also includes a respective user identifier and a respective quality of service metric.

BRIEF DESCRIPTION OF THE DRAWINGS

FIG. 5 illustrates a typical allocation of instance servers to various programs or processes, according to some embodiments.

Like reference numerals refer to corresponding parts throughout the drawings.

DESCRIPTION OF EMBODIMENTS

Before discussing techniques for replicating objects in a distributed storage system, it is instructive to present an exemplary system in which these techniques may be used.

Distributed Storage System Overview

Figure 1A:
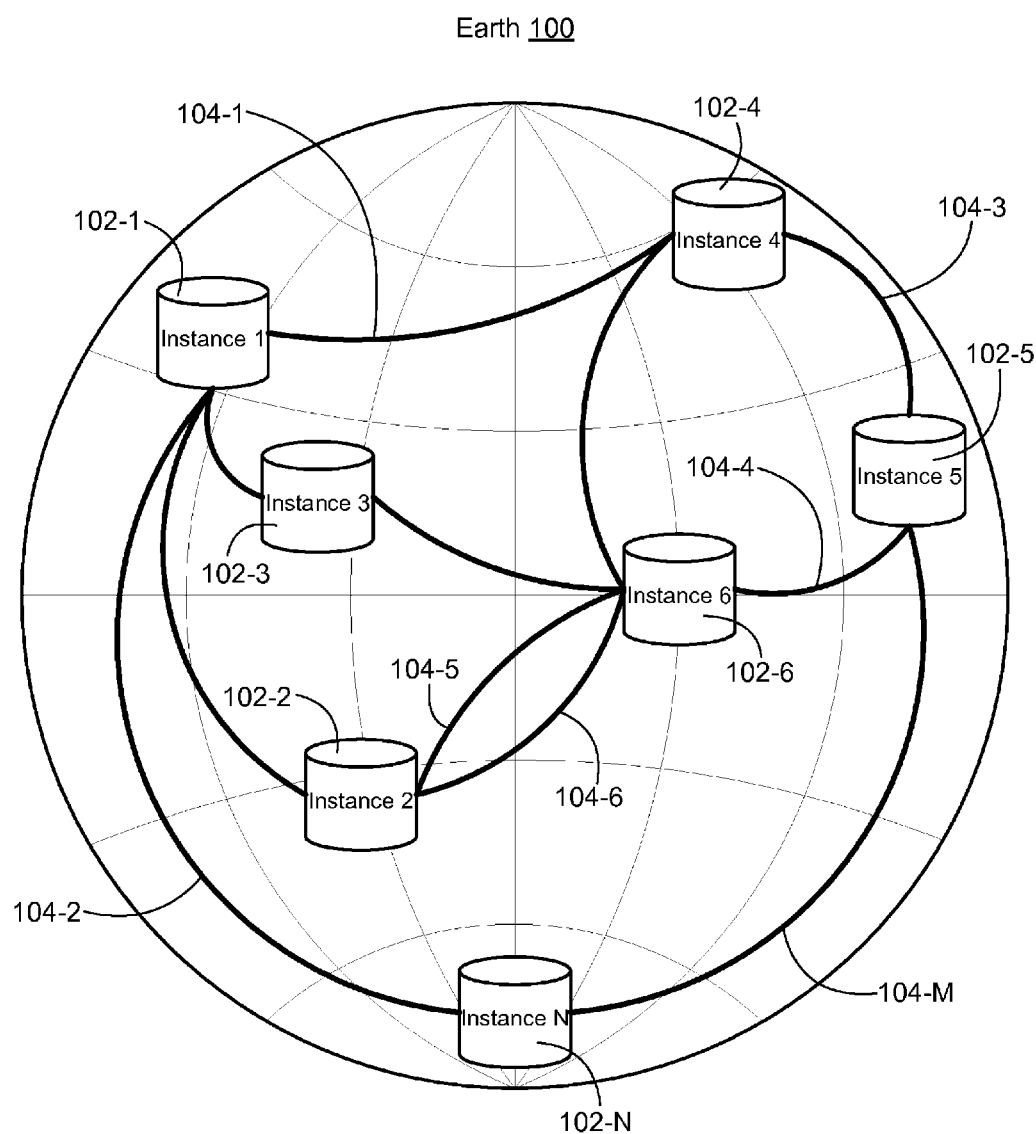
FIG. 1A is a conceptual illustration for placing multiple instances of a database at physical sites all over the globe, according to some embodiments.
Figure 2:
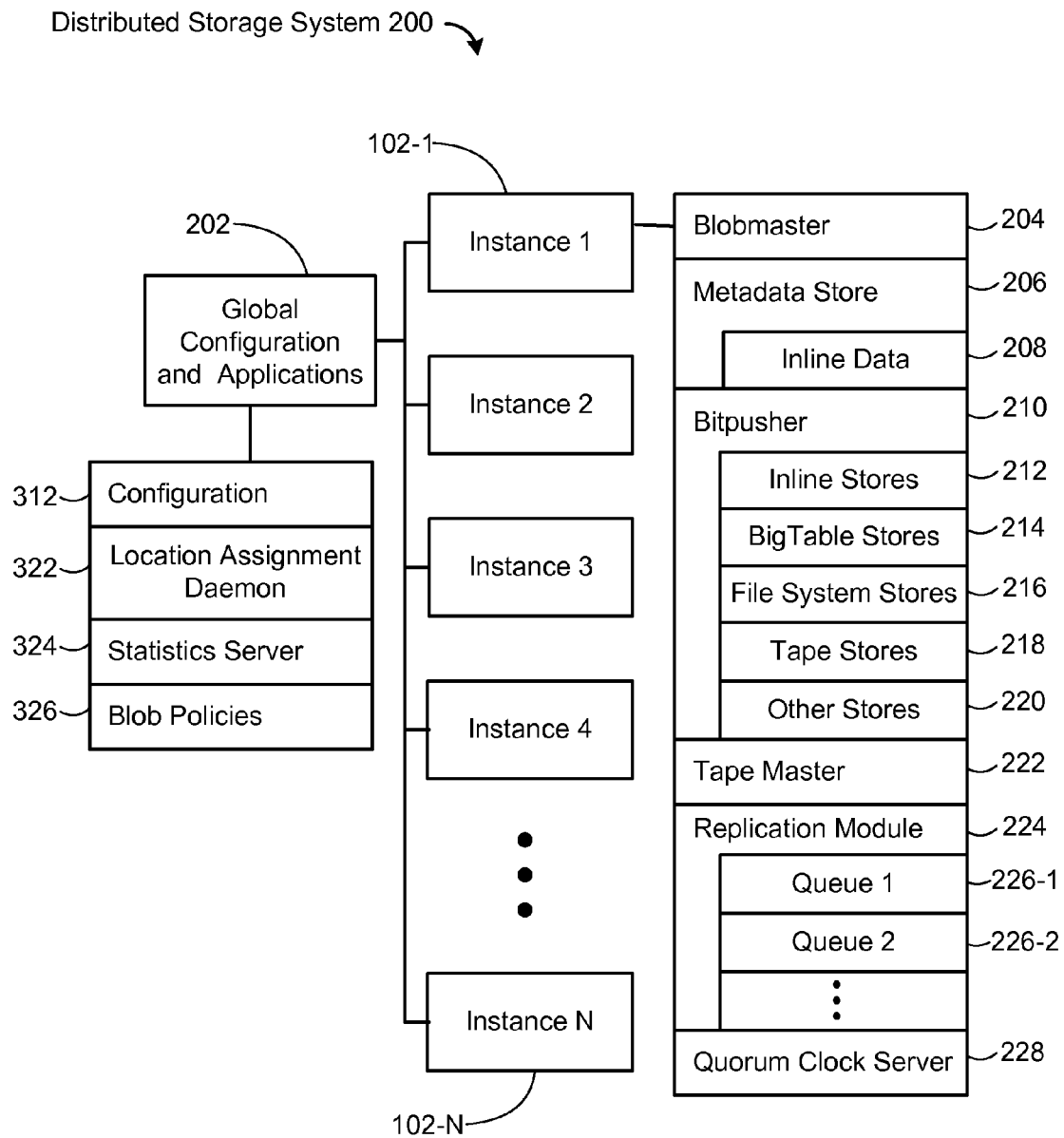
FIG. 2 is a block diagram illustrating multiple instances of a replicated database, with an exemplary set of programs and/or processes shown for the first instance according to some embodiments.
Figure 3:
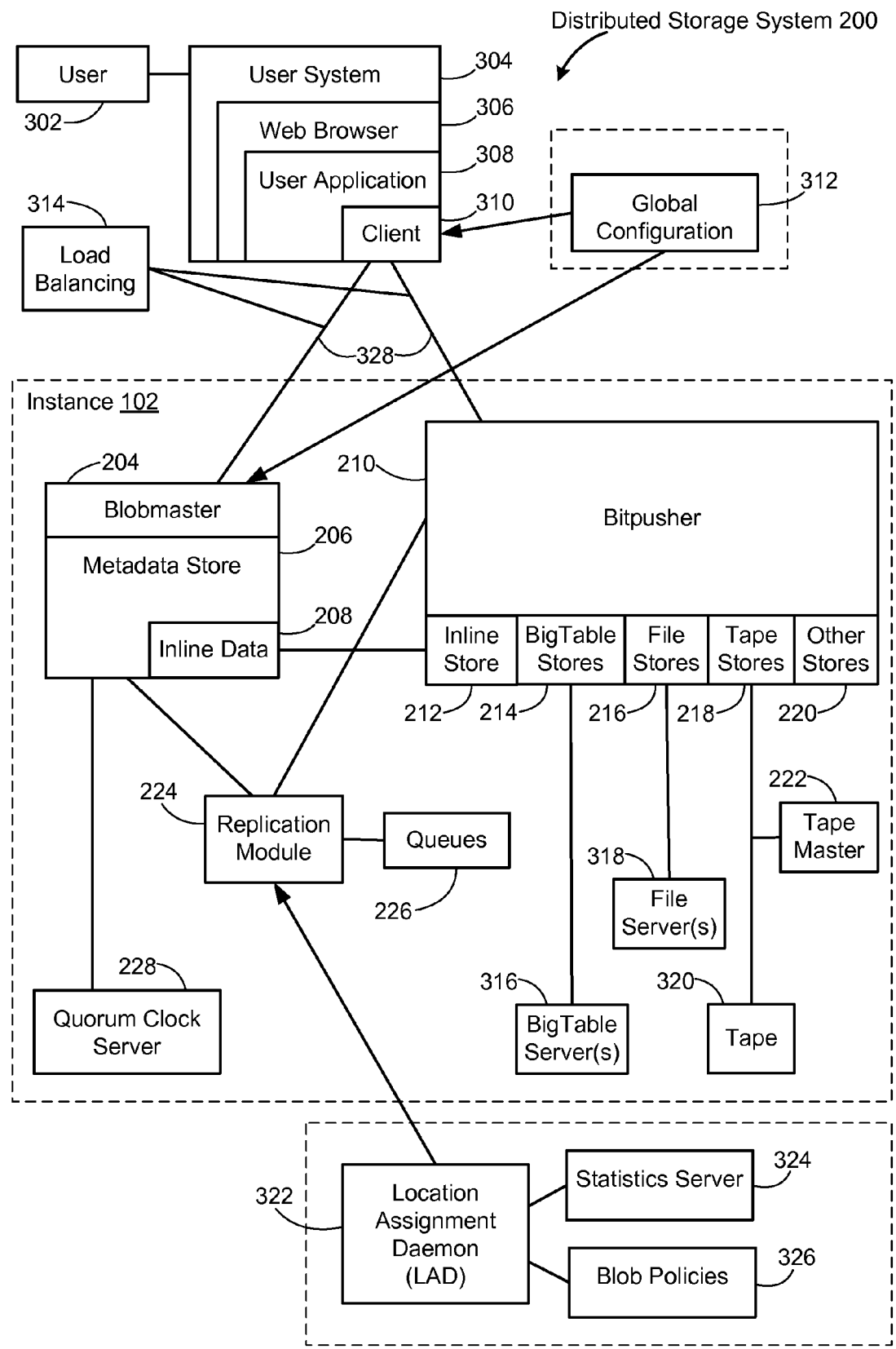
FIG. 3 is a block diagram that illustrates an exemplary instance for the system, and illustrates what blocks within the instance with which a user interacts, according to some embodiments.

The present specification describes a distributed storage system. In some embodiments, as illustrated in FIG. 1A, the distributed storage system is implemented on a global or planet-scale. In these embodiments, there is a plurality of instances 102-1, 102-2, . . . 102-N at various locations on the Earth 100, connected by network communication links 104-1, 104-2, . . . 104-M. In some embodiments, an instance (such as instance 102-1) corresponds to a data center. In other embodiments, multiple instances are physically located at the same data center. Although the conceptual diagram of FIG. 1A shows a limited number of network communication links 104-1, etc., typical embodiments would have many more network communication links. In some embodiments, there are two or more network communication links between the same pair of instances, as illustrated by links 104-5 and 104-6 between instance 2 (102-2) and instance 6 (102-6). In some embodiments, the network communication links are composed of fiber optic cable. In some embodiments, some of the network communication links use wireless technology, such as microwaves. In some embodiments, each network communication link has a specified bandwidth and/or a specified cost for the use of that bandwidth. In some embodiments, statistics are maintained about the transfer of data across one or more of the network communication links, including throughput rate, times of availability, reliability of the links, etc. Each instance typically has data stores and associated databases (as shown in FIGS. 2 and 3), and utilizes a farm of server computers ("instance servers," see FIG. 4) to perform all of the tasks. In some embodiments, there are one or more instances that have limited functionality, such as acting as a repeater for data transmissions between other instances. Limited functionality instances may or may not have any of the data stores depicted in FIGS. 3 and 4.

Figure 1B:
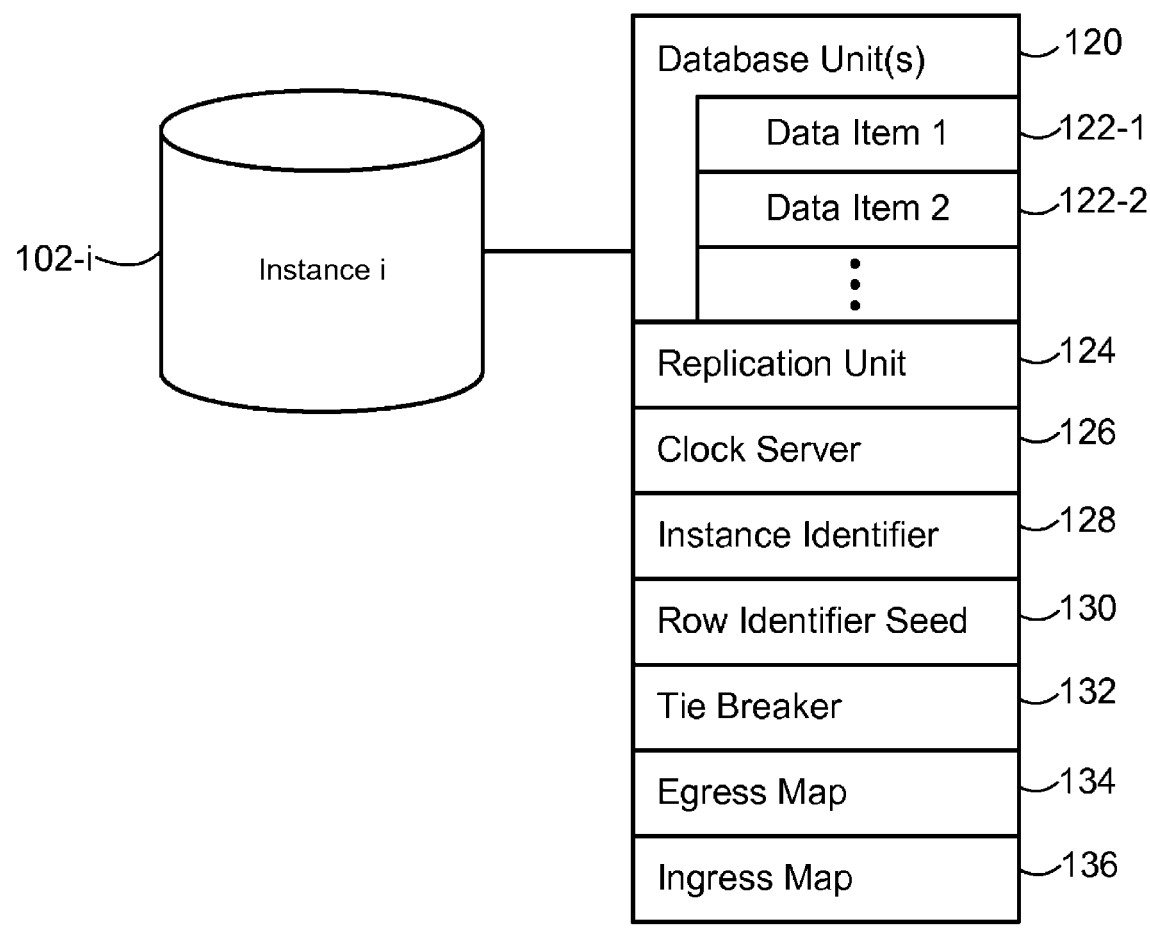
FIG. 1B illustrates basic functionality at each instance according to some embodiments.

FIG. 1B illustrates data and programs at an instance 102-$i$ that store and replicate data between instances. The underlying data items 122-1, 122-2, etc. are stored and managed by one or more database units 120. Each instance 102-$i$ has a replication unit 124 that replicates data to and from other instances. The replication unit 124 also manages one or more egress maps 134 that track data sent to and acknowledged by other instances. Similarly, the replication unit 124 manages one or more ingress maps, which track data received at the instance from other instances. Egress maps and ingress maps are described in more detail with respect to FIGS. 14A-14D, 15A, and 17 of co-pending U.S. patent application Ser. No. 12/703,167, "Method and System for Efficiently Replicating Data in Non-Relational Databases," filed Feb. 9, 2010, which is incorporated herein by reference in its entirety.

Each instance 102-i has one or more clock servers 126 that provide accurate time. In some embodiments, the clock servers 126 provide time as the number of microseconds past a well-defined point in the past. In some embodiments, the clock servers provide time readings that are guaranteed to be monotonically increasing. In some embodiments, each instance server 102-i stores an instance identifier 128 that uniquely identifies itself within the distributed storage system. The instance identifier may be saved in any convenient format, such as a 32-bit integer, a 64-bit integer, or a fixed length character string. In some embodiments, the instance identifier is incorporated (directly or indirectly) into other unique identifiers generated at the instance. In some embodiments, an instance 102-i stores a row identifier seed 130, which is used when new data items 122 are inserted into the database. A row identifier is used to uniquely identify each data item 122. In some embodiments, the row identifier seed is used to create a row identifier, and simultaneously incremented, so that the next row identifier will be greater. In other embodiments, unique row identifiers are created from a timestamp provided by the clock servers 126, without the use of a row identifier seed. In some embodiments, a tie breaker value 132 is used when generating row identifiers or unique identifiers for data changes (described with respect to FIG. 6-9 of co-pending U.S. patent application Ser. No. 12/703,167, "Method and System for Efficiently Replicating Data in Non-Relational Databases," filed Feb. 9, 2010, which is incorporated herein by reference in its entirety. In some embodiments, a tie breaker 132 is stored permanently in non-volatile memory (such as a magnetic or optical disk).

The elements described in FIG. 1B are incorporated in embodiments of the distributed storage system 200 illustrated in FIGS. 2 and 3. In some embodiments, the functionality described in FIG. 1B is included in a blobmaster 204 and metadata store 206. In these embodiments, the primary data storage (i.e., blobs) is in the data stores 212, 214, 216, 218, and 220, and managed by bitpushers 210. The metadata for the blobs is in the metadata store 206, and managed by the blobmaster 204. The metadata corresponds to the functionality identified in FIG. 1B. Although the metadata for storage of blobs provides an exemplary embodiment of the present invention, one of ordinary skill in the art would recognize that the present invention is not limited to this embodiment.

In some embodiments the disclosed distributed storage system 200, the distributed storage system is used by one or more user applications 308, which are provided by application servers, such as 150-1, 150-2, 150-3, 150-4, and 150-5 illustrated in FIGS. 1C-1G. Exemplary user applications that use embodiments of the disclosed distributed storage system include Gmail, YouTube, Orkutt, Google Docs, and Picassa. Some embodiments of the disclosed distributed storage system simultaneously provide storage for multiple distinct user applications, and impose no limit on the number of distinct user applications that can use the distributed storage system. For example, a single implementation of the disclosed distributed storage system may provide storage services for all of the exemplary user applications listed above. In some embodiments, a user application 308 runs in a web browser 306, on a user computer system 304. A user 302 interacts with a user application 308 according to the interface provided by the user application. Each user application 308 uses a client library 310 to store and retrieve data from the distributed storage system 200.

Figure 1C:
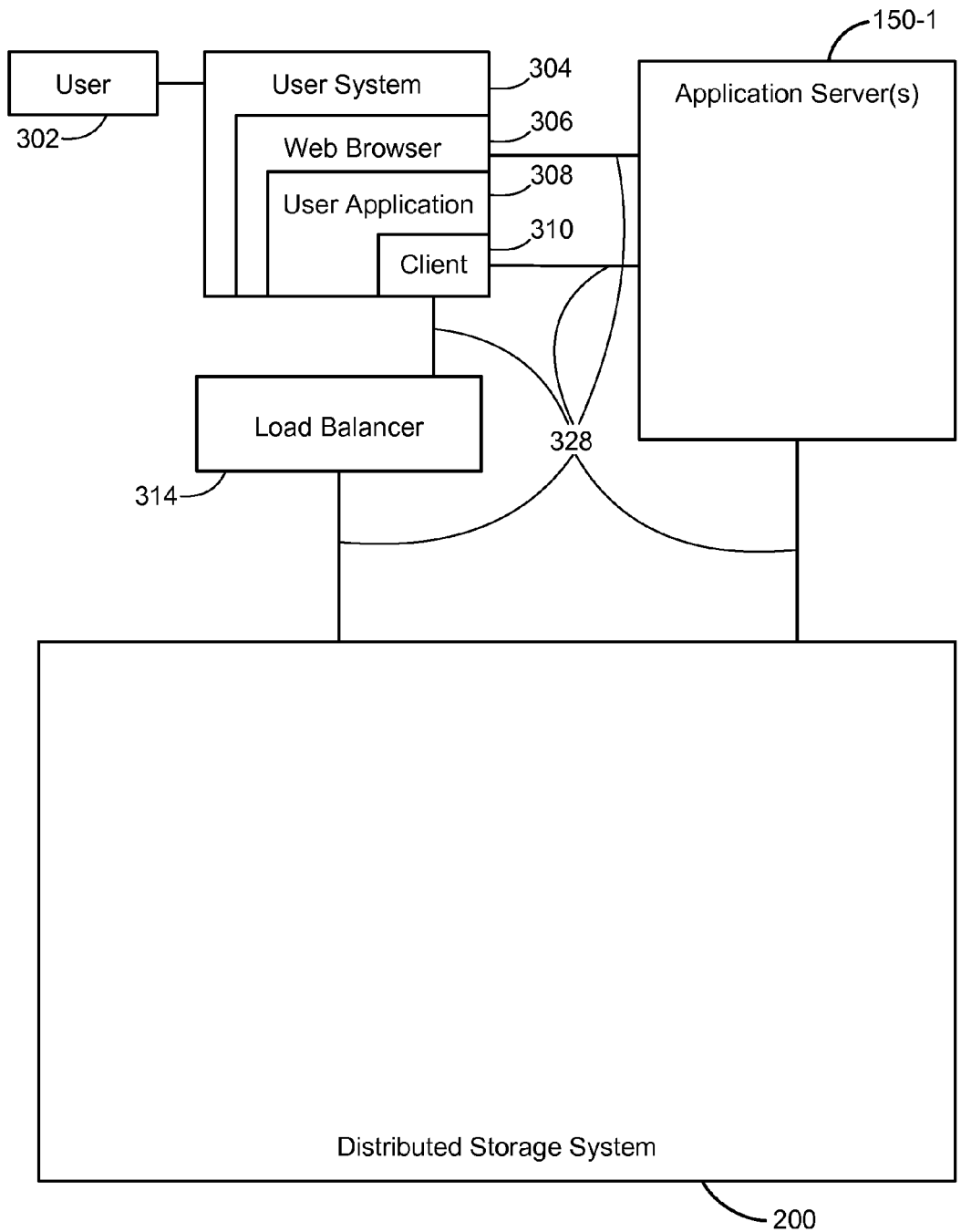
FIGS. 1C-1G illustrate ways that a distributed storage system may be integrated with systems that provide user applications according to some embodiments.

FIG. 1C illustrates an embodiment in which a user application is provided by one or more application servers 150-1. In some embodiments, the web browser 306 downloads user application 308 over a network 328 from the application servers 150-1. In addition to communication between the application server 150-1 and the user system 304, the application server(s) 150-1 communicate over network 328 with the distributed storage system 200. In particular, the application servers may establish storage policies 326 that are applicable to all data stored by the supplied user application. For example, administrators of the Gmail Application servers may establish storage policies 326 that are applicable to millions of user of Gmail.

In some embodiments, communication between the client library 310 and the distributed storage system utilizes a load balancer 314, which can distribute user requests to various instances within the distributed storage system based on various conditions, such as network traffic and usage levels at each instance. In the embodiment illustrated in FIG. 1C, the load balancer 314 is not an integrated component of the distributed storage system 200. The load balancer 314 communicates with both the client library 310 and the distributed storage system 200 over one or more networks 328. The network 328 may include the Internet, one or more local area networks (LANs), one or more wide are networks (WANs), one or more wireless networks (WiFi networks), or various combinations of these.

Figure 1D:
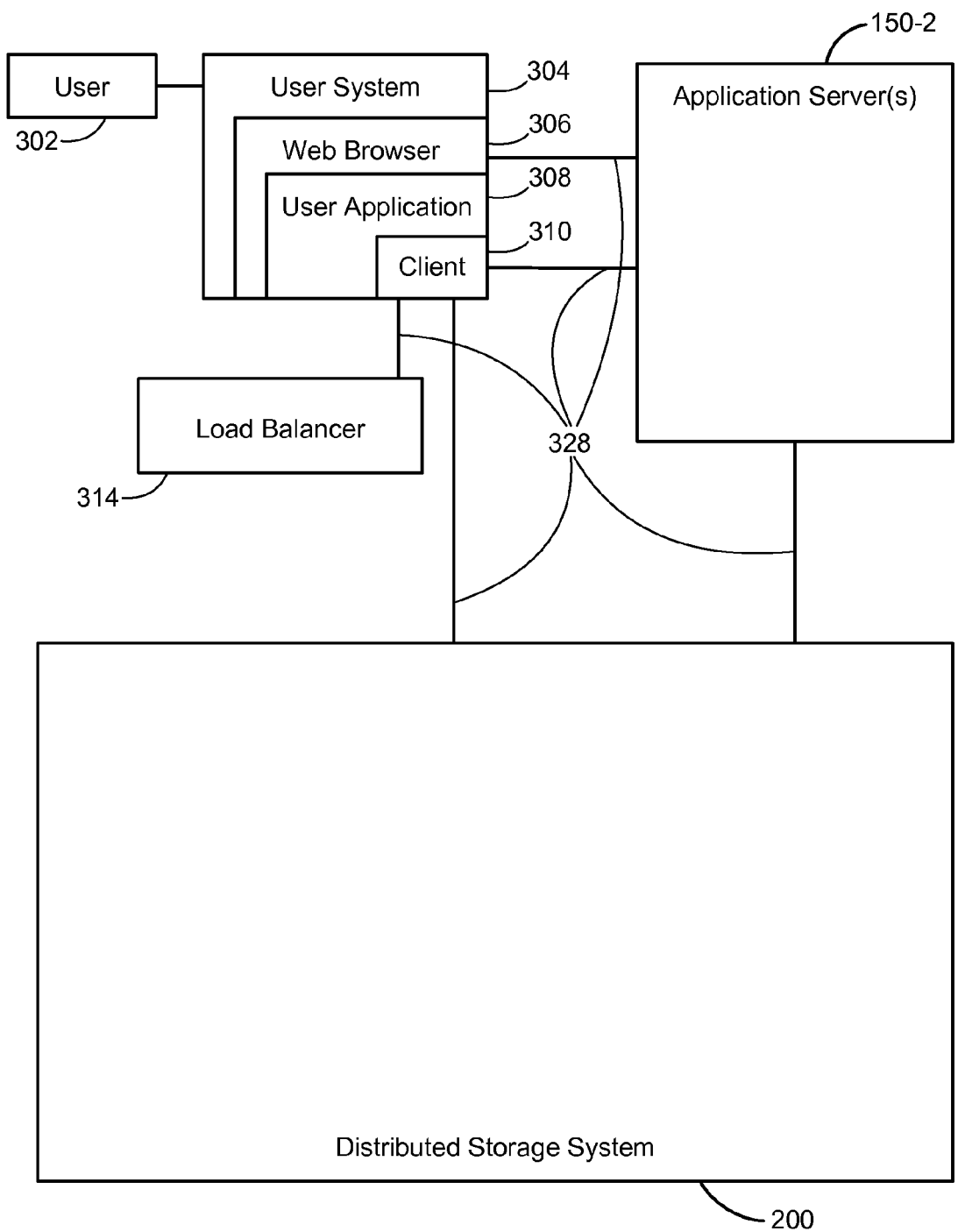

FIG. 1D illustrates an embodiment that is similar to FIG. 1C, except that the load balancing system 314 just returns information to the client library 310 to specify which instance 102 within the distributed storage system 200 should be contacted. The client library 310 then contacts the appropriate instance 102 directly.

Figure 1E:
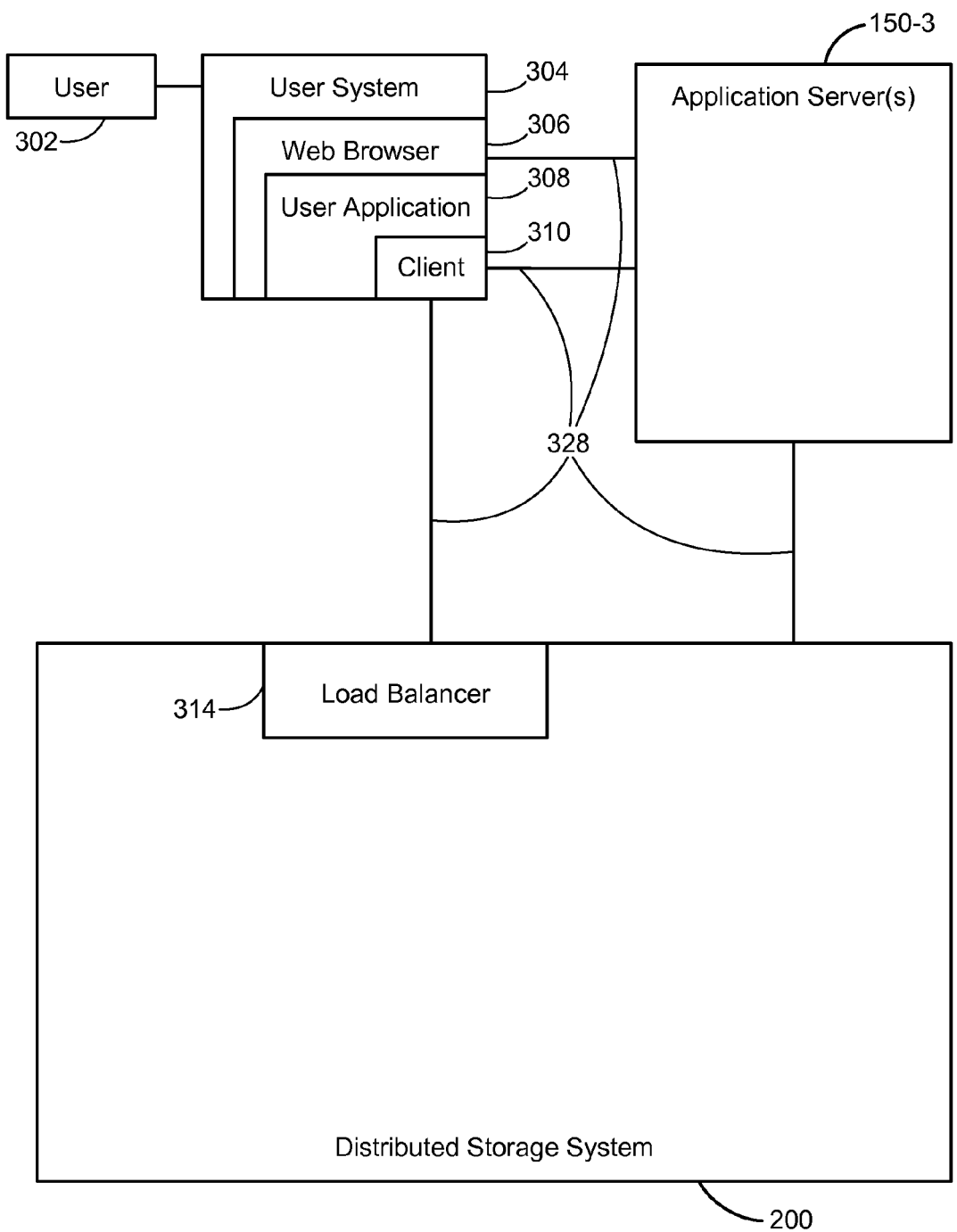

FIG. 1E illustrates an embodiment that is similar to FIG. 1C, except that the load balancing system 314 is an integrated part of the distributed storage application 200. In some embodiments, load balancers 314 are included at some or all of the instances within the distributed storage system 200. Even in these embodiments, a load balancer 314 may direct the communication to a different instance.

Figure 1F:
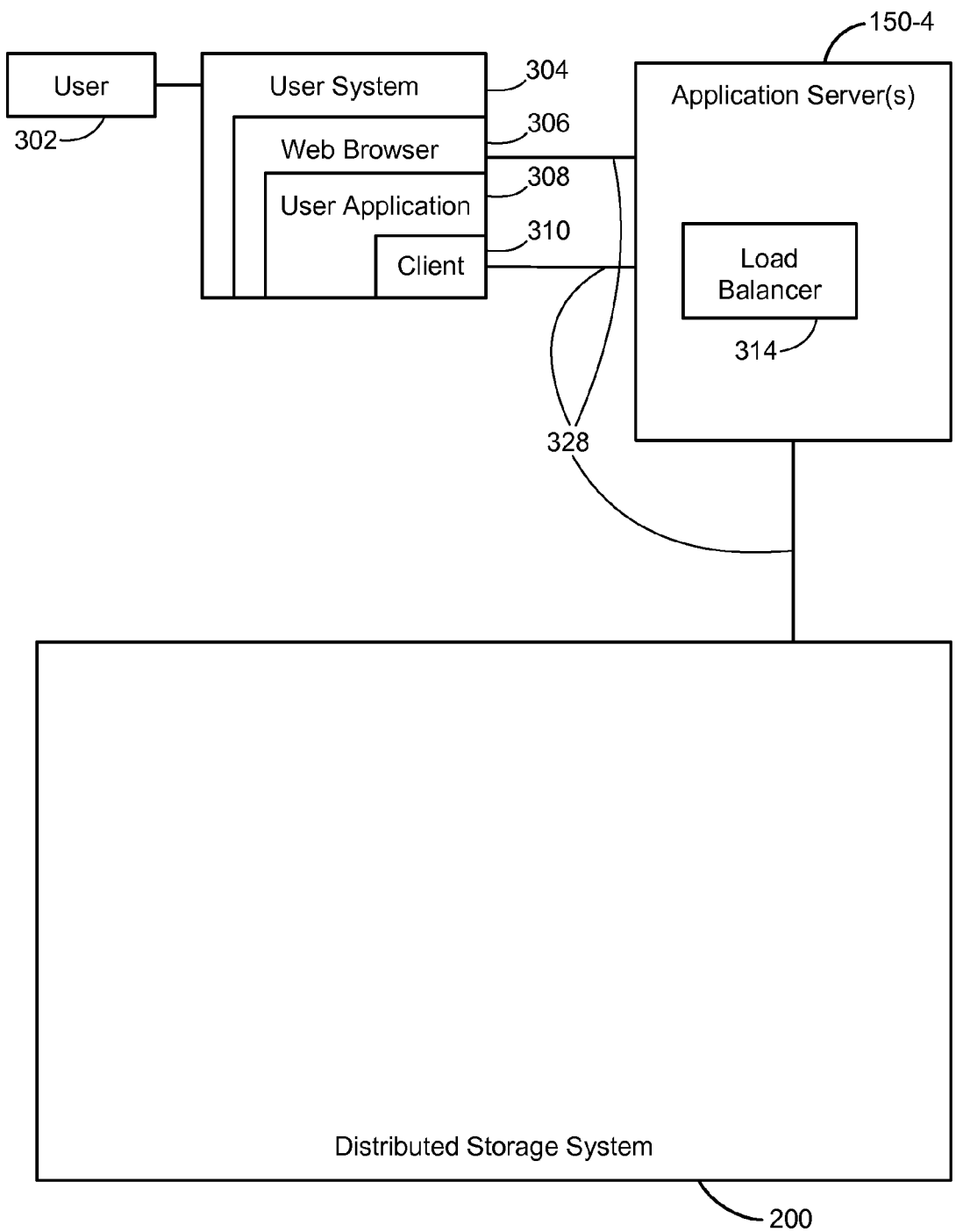

FIG. 1F illustrates an embodiment that is similar to FIG. 1C, except that the load balancing service 314 is included in the application servers 150-4. This embodiment is more commonly used when the distributed storage system 200 is being used by a single user application provided by the application servers 150-4. In this case, the load balancer 314 has a complete picture of the load because the application servers 150-4 receive all of the traffic directed to the distributed storage system.

Figure 1G:
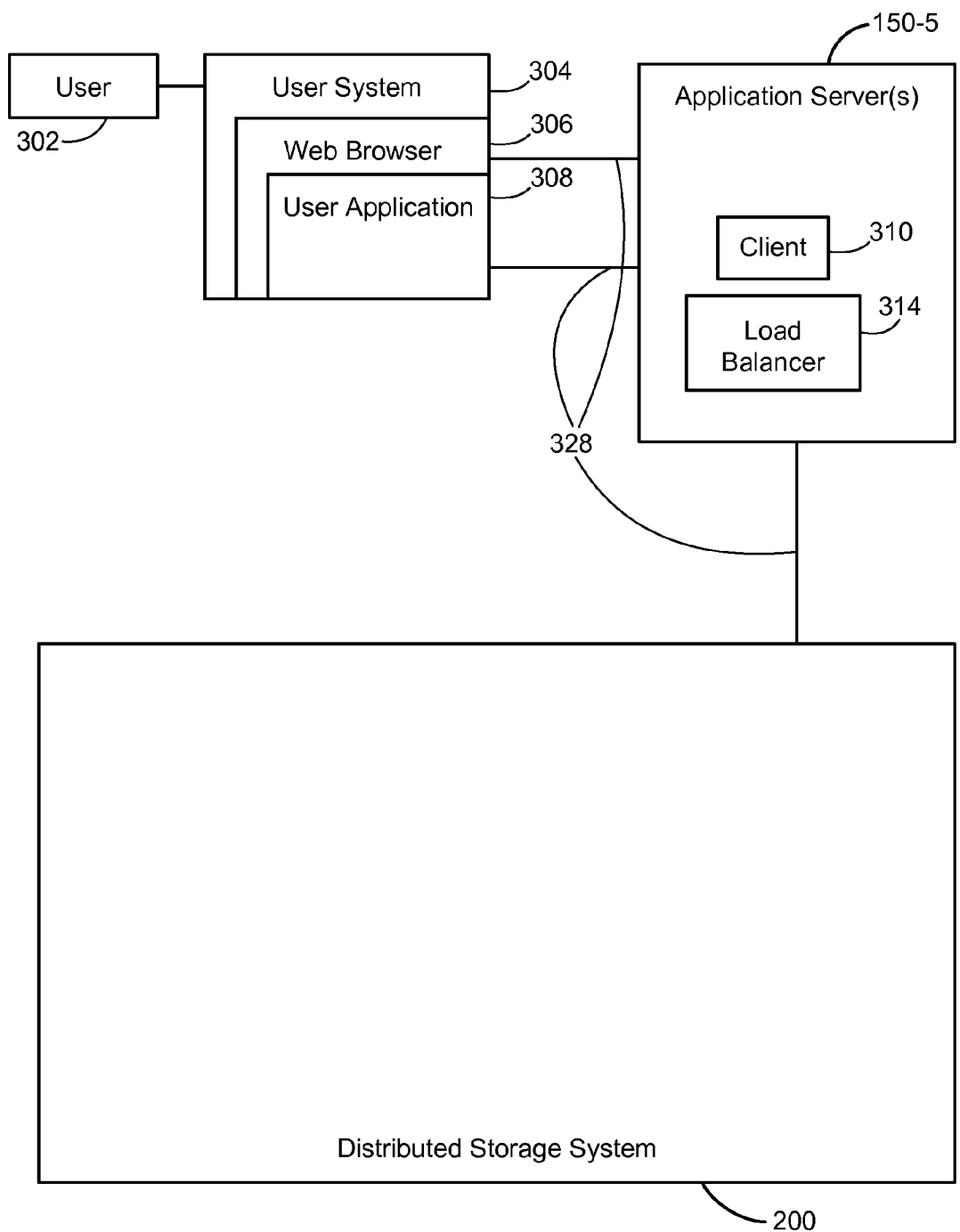

FIG. 1G illustrates a variation of FIG. 1F, in which the client library 310 is maintained at the application servers 150-5 rather than integrated within the running user application 308.

The distributed storage system 200 shown in FIGS. 2 and 3 includes certain global applications and configuration information 202, as well as a plurality of instances 102-1, . . . 102-N. In some embodiments, the global configuration information includes a list of instances and information about each instance. In some embodiments, the information for each instance includes: the set of storage nodes (data stores) at the instance; the state information, which in some embodiments includes whether the metadata at the instance is global or local; and network addresses to reach the blobmaster 204 and bitpusher 210 at the instance. In some embodiments, the global configuration information 202 resides at a single physical location, and that information is retrieved as needed. In other embodiments, copies of the global configuration information 202 are stored at multiple locations. In some embodiments, copies of the global configuration information 202 are stored at some or all of the instances. In some embodiments, the global configuration information can only be modified at a single location, and changes are transferred to other locations by one-way replication. In some embodiments, there are certain global applications, such as the location assignment daemon 346 (see FIG. 3) that can only run at one location at any given time. In some embodiments, the global applications run at a selected instance, but in other embodiments, one or more of the global applications runs on a set of servers distinct from the instances. In some embodiments, the location where a global application is running is specified as part of the global configuration information 202, and is subject to change over time.

FIGS. 2 and 3 illustrate an exemplary set of programs, processes, and data that run or exist at each instance, as well as a user system that may access the distributed storage system 200 and some global applications and configuration. In some embodiments, a user 302 interacts with a user system 304, which may be a computer or other device that can run a web browser 306. A user application 308 runs in the web browser, and uses functionality provided by database client 310 to access data stored in the distributed storage system 200 using network 328. Network 328 may be the Internet, a local area network (LAN), a wide area network (WAN), a wireless network (WiFi), a local intranet, or any combination of these. In some embodiments, a load balancer 314 distributes the workload among the instances, so multiple requests issued by a single client 310 need not all go to the same instance. In some embodiments, database client 310 uses information in a global configuration store 312 to identify an appropriate instance for a request. The client uses information from the global configuration store 312 to find the set of blobmasters 204 and bitpushers 210 that are available, and where to contact them. A blobmaster 204 uses a global configuration store 312 to identify the set of peers for all of the replication processes. A bitpusher 210 uses information in a global configuration store 312 to track which stores it is responsible for. In some embodiments, user application 308 runs on the user system 304 without a web browser 306. Exemplary user applications are an email application and an online video application.

In some embodiments, each instance has a blobmaster 204, which is a program that acts as an external interface to the metadata table 206. For example, an external user application 308 can request metadata corresponding to a specified blob using client 310. Note that a "blob" (i.e., a binary large object) is a collection of binary data (e.g., images, videos, binary files, executable code, etc.) stored as a single entity in a database. This specification uses the terms "blob" and "object" interchangeably and embodiments that refer to a "blob" may also be applied to "objects," and vice versa. In general, the term "object" may refer to a "blob" or any other object such as a database object, a file, or the like, or a portion (or subset) of the aforementioned objects. In some embodiments, every instance 102 has metadata in its metadata table 206 corresponding to every blob stored anywhere in the distributed storage system 200. In other embodiments, the instances come in two varieties: those with global metadata (for every blob in the distributed storage system 200) and those with only local metadata (only for blobs that are stored at the instance). In particular, blobs typically reside at only a small subset of the instances. The metadata table 206 includes information relevant to each of the blobs, such as which instances have copies of a blob, who has access to a blob, and what type of data store is used at each instance to store a blob.

The metadata table 206 is described in greater detail in co-pending U.S. patent application Ser. No. 12/703,167, "Method and System for Efficiently Replicating Data in Non-Relational Databases," filed Feb. 9, 2010, which is incorporated herein by reference in its entirety.

When a client 310 wants to read a blob of data, the blobmaster 204 provides one or more read tokens to the client 310, which the client 310 provides to a bitpusher 210 in order to gain access to the relevant blob. When a client 310 writes data, the client 310 writes to a bitpusher 210. The bitpusher 210 returns write tokens indicating that data has been stored, which the client 310 then provides to the blobmaster 204, in order to attach that data to a blob. A client 310 communicates with a bitpusher 210 over network 328, which may be the same network used to communicate with the blobmaster 204. The communication between the client 310 and bitpushers is also subject to load balancing 314. Because of load balancing or other factors, communication with a blobmaster 204 at one instance may be followed by communication with a bitpusher 210 at a different instance. For example, the first instance may be a global instance with metadata for all of the blobs, but may not have a copy of the desired blob. The metadata for the blobs identifies which instances have copies of the desired blob, so the subsequent communication with a bitpusher 210 to read or write is at a different instance.

A bitpusher 210 copies data to and from data stores. In some embodiments, the read and write operations comprise entire blobs. In other embodiments, each blob comprises one or more chunks, and the read and write operations performed by a bitpusher are on solely on chunks. In some of these embodiments, a bitpusher deals only with chunks, and has no knowledge of blobs. In some embodiments, a bitpusher has no knowledge of the contents of the data that is read or written, and does not attempt to interpret the contents. Embodiments of a bitpusher 210 support one or more types of data store. In some embodiments, a bitpusher supports a plurality of data store types, including inline data stores 212, BigTable stores 214, file server stores 216, and tape stores 218. Some embodiments support additional other stores 220, or are designed to accommodate other types of data stores as they become available or technologically feasible.

Inline stores 212 actually use storage space 208 in the metadata store 206. Inline stores provide faster access to the data, but have limited capacity, so inline stores are generally for relatively "small" blobs. In some embodiments, inline stores are limited to blobs that are stored as a single chunk. In some embodiments, "small" means blobs that are less than 32 kilobytes. In some embodiments, "small" means blobs that are less than 1 megabyte. As storage technology facilitates greater storage capacity, even blobs that are currently considered large may be "relatively small" compared to other blobs.

BigTable stores 214 store data in BigTables located on one or more BigTable database servers 316. BigTables are described in several publicly available publications, including "Bigtable: A Distributed Storage System for Structured Data," Fay Chang et al, OSDI 2006, which is incorporated herein by reference in its entirety. In some embodiments, the BigTable stores save data on a large array of servers 316.

File stores 216 store data on one or more file servers 318. In some embodiments, the file servers use file systems provided by computer operating systems, such as UNIX. In other embodiments, the file servers 318 implement a proprietary file system, such as the Google File System (GFS). GFS is described in multiple publicly available publications, including "The Google File System," Sanjay Ghemawat et al., SOSP'03, Oct. 19-22, 2003, which is incorporated herein by reference in its entirety. In other embodiments, the file servers 318 implement NFS (Network File System) or other publicly available file systems not implemented by a computer operating system. In some embodiments, the file system is distributed across many individual servers 318 to reduce risk of loss or unavailability of any individual computer.

Tape stores 218 store data on physical tapes 320. Unlike a tape backup, the tapes here are another form of storage. The tape stores 218 are described in greater detail in co-pending application U.S. Provisional Patent Application No. 61/302,909, filed Feb. 9, 2010, subsequently filed as U.S. patent application Ser. No. 13/023,498, filed on Feb. 8, 2011, "Method and System for Providing Efficient Access to a Tape Storage System," which is incorporated herein by reference in its entirety. In some embodiments, a Tape Master application 222 assists in reading and writing from tape. In some embodiments, there are two types of tape: those that are physically loaded in a tape device, so that the tapes can be robotically loaded; and those tapes that physically located in a vault or other offline location, and require human action to mount the tapes on a tape device. In some instances, the tapes in the latter category are referred to as deep storage or archived. In some embodiments, a large read/write buffer is used to manage reading and writing data to tape. In some embodiments, this buffer is managed by the tape master application 222. In some embodiments there are separate read buffers and write buffers. In some embodiments, a client 310 cannot directly read or write to a copy of data that is stored on tape. In these embodiments, a client must read a copy of the data from an alternative data source, even if the data must be transmitted over a greater distance.

In some embodiments, there are additional other stores 220 that store data in other formats or using other devices or technology. In some embodiments, bitpushers 210 are designed to accommodate additional storage technologies as they become available.

Each of the data store types has specific characteristics that make them useful for certain purposes. For example, inline stores provide fast access, but use up more expensive limited space. As another example, tape storage is very inexpensive, and provides secure long-term storage, but a client cannot directly read or write to tape. In some embodiments, data is automatically stored in specific data store types based on matching the characteristics of the data to the characteristics of the data stores. In some embodiments, users 302 who create files may specify the type of data store to use. In other embodiments, the type of data store to use is determined by the user application 308 that creates the blobs of data. In some embodiments, a combination of the above selection criteria is used. In some embodiments, each blob is assigned to a storage policy 326, and the storage policy specifies storage properties. A blob policy 326 may specify the number of copies of the blob to save, in what types of data stores the blob should be saved, locations where the copies should be saved, etc. For example, a policy may specify that there should be two copies on disk (Big Table stores or File Stores), one copy on tape, and all three copies at distinct metro locations. In some embodiments, blob policies 326 are stored as part of the global configuration and applications 202.

In some embodiments, each instance 102 has a quorum clock server 228, which comprises one or more servers with internal clocks. The order of events, including metadata deltas 608, is important, so maintenance of a consistent time clock is important. A quorum clock server regularly polls a plurality of independent clocks, and determines if they are reasonably consistent. If the clocks become inconsistent and it is unclear how to resolve the inconsistency, human intervention may be required. The resolution of an inconsistency may depend on the number of clocks used for the quorum and the nature of the inconsistency. For example, if there are five clocks, and only one is inconsistent with the other four, then the consensus of the four is almost certainly right. However, if each of the five clocks has a time that differs significantly from the others, there would be no clear resolution. It is important to note that even if the quorum clock server 228 determines that the independent clocks are consistent with each other (or with a subset of each other), the independent clocks may still be unreliable. For example, it is possible the independent clocks are skewed in the same direction (e.g., skewed to the future or past). Thus, calculating time intervals using times reported by the quorum clock server 228 may still produce incorrect behavior. The embodiments described below may be used to determine time intervals between two times reported by an unreliable clock (e.g., the clock generated by the quorum clock server 228). Techniques for determining time intervals between two times reported by an unreliable clock are described in greater detail in co-pending U.S. Provisional Patent Application No. 61/302,894, filed Feb. 9, 2010, subsequently filed as U.S. patent application Ser. No. 13/022,551, filed Feb. 7, 2011, "System and Method for Determining the Age of Objects in the Presence of Unreliable Clocks," which is incorporated herein by reference in its entirety.

In some embodiments, each instance has a replication module 224, which identifies blobs or chunks that will be replicated to other instances. In some embodiments, the replication module 224 may use one or more replication queues 226-1, 226-2, . . . Items to be replicated are placed in a replication queue 226, and the items are replicated when resources are available. In some embodiments, items in a replication queue 226 have assigned priorities, and the highest priority items are replicated as bandwidth becomes available. There are multiple ways that items can be added to a replication queue 226. In some embodiments, items are added to replication queues 226 when blob or chunk data is created or modified. For example, if an end user 302 modifies a blob at instance 1, then the modification needs to be transmitted to all other instances that have copies of the blob. In embodiments that have priorities in the replication queues 226, replication items based on blob content changes have a relatively high priority. In some embodiments, items are added to the replication queues 226 based on a current user request for a blob that is located at a distant instance. For example, if a user in California requests a blob that exists only at an instance in India, an item may be inserted into a replication queue 226 to copy the blob from the instance in India to a local instance in California. That is, since the data has to be copied from the distant location anyway, it may be useful to save the data at a local instance. These dynamic replication requests receive the highest priority because they are responding to current user requests. The dynamic replication process is described in more detail in co-pending U.S. Provisional Patent Application No. 61/302,896, filed Feb. 9, 2010. subsequently filed as U.S. patent application Ser. No. 13/022,579, filed Feb. 7, 2011, "Method and System for Dynamically Replicating Data within a Distributed Storage System," which is incorporated herein by reference in its entirety.

In some embodiments, a background replication process creates and deletes copies of blobs based on blob policies 326 and blob access data provided by a statistics server 324. The blob policies specify how many copies of a blob are desired, where the copies should reside, and in what types of data stores the data should be saved. In some embodiments, a policy may specify additional properties, such as the number of generations of a blob to save, or time frames for saving different numbers of copies. E.g., save three copies for the first 30 days after creation, then two copies thereafter. Using blob policies 326, together with statistical information provided by the statistics server 324, a location assignment daemon 322 determines where to create new copies of a blob and what copies may be deleted. When new copies are to be created, records are inserted into a replication queue 226. The use of blob policies 326 and the operation of a location assignment daemon 322 are described in more detail in co-pending U.S. Provisional Patent Application No. 61/302,936, filed Feb. 9, 2010, subsequently filed as U.S. patent application 13/022,290, filed Feb. 7, 2011, "System and Method for Managing Replicas of Objects in a Distributed Storage System," which is incorporated herein by reference in its entirety. The replication queues 226 are described in more detail below.

Figure 4:
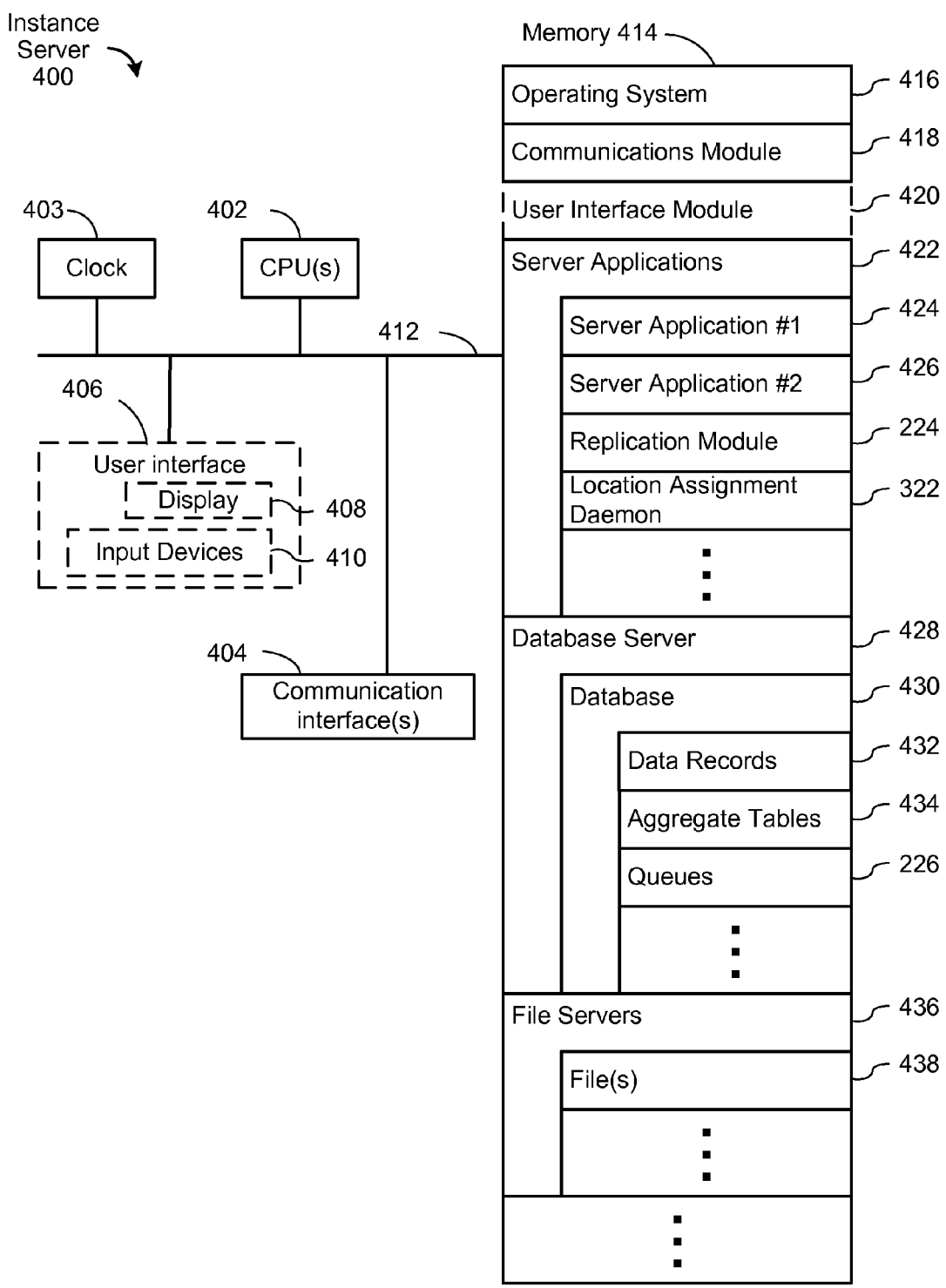
FIG. 4 is a block diagram of an instance server that may be used for the various programs and processes, according to some embodiments.

FIG. 4 is a block diagram illustrating an Instance Server 400 used for operations identified in FIGS. 2 and 3 in accordance with some embodiments of the present invention. An Instance Server 400 typically includes one or more processing units (CPU's) 402 for executing modules, a clock 403 that reports the current date and/or time, programs and/or instructions stored in memory 414 and thereby performing processing operations, one or more network or other communications interfaces 404, memory 414, and one or more communication buses 412 for interconnecting these components. In some embodiments, the clock 403 is a local clock that is periodically synchronized with a clock server (e.g., a quorum clock server 228 or any other clock server on a network, etc.). In some embodiments, an Instance Server 400 includes a user interface 406 comprising a display device 408 and one or more input devices 410. In some embodiments, memory 414 includes high-speed random access memory, such as DRAM, SRAM, DDR RAM or other random access solid state memory devices. In some embodiments, memory 414 includes non-volatile memory, such as one or more magnetic disk storage devices, optical disk storage devices, flash memory devices, or other non-volatile solid state storage devices. In some embodiments, memory 414 includes one or more storage devices remotely located from the CPU(s) 402. Memory 414, or alternately the non-volatile memory device(s) within memory 414, comprises a computer readable storage medium. In some embodiments, memory 414 or the computer readable storage medium of memory 414 stores the following programs, modules and data structures, or a subset thereof:

- an operating system 416 that includes procedures for handling various basic system services and for performing hardware dependent tasks;
- a communications module 418 that is used for connecting an Instance Server 400 to other Instance Servers or computers via the one or more communication network interfaces 404 (wired or wireless) and one or more communication networks 328, such as the Internet, other wide area networks, local area networks, metropolitan area networks, and so on;
- an optional user interface module 420 that receives commands from the user via the input devices 410 and generates user interface objects in the display device 408;
- one or more server applications 422, such as a blobmaster 204 that provides an external interface to the blob metadata; a bitpusher 210 that provides access to read and write data from data stores; a replication module 224 that copies data from one instance to another; a quorum clock server 228 that provides a stable clock; a location assignment daemon 322 that determines where copies of a blob should be located; and other server functionality as illustrated in FIGS. 2 and 3. As illustrated, two or more server applications 424 and 426 may execute on the same physical computer; and
- one or more database servers 428 that provides storage and access to one or more databases 430. The databases 430 may provide storage for metadata 206, replication queues 226, blob policies 326, global configuration 312, the statistics used by statistics server 324, as well as ancillary databases used by any of the other functionality. Each database 430 has one or more tables with data records 432. In some embodiments, some databases include aggregate tables 434, such as the statistics used by statistics server 324;
- one or more file servers 436 that provide access to read and write files, such as files 438. File server functionality may be provided directly by an operating system (e.g., UNIX or Linux), or by a software application, such as the Google File System (GFS).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 414 may store a subset of the modules and data structures identified above. Furthermore, memory 414 may store additional modules or data structures not described above.

Although FIG. 4 shows an instance server used for performing various operations or storing data as illustrated in FIGS. 2 and 3, FIG. 4 is intended more as functional description of the various features which may be present in a set of one or more computers rather than as a structural schematic of the embodiments described herein. In practice, and as recognized by those of ordinary skill in the art, items shown separately could be combined and some items could be separated. For example, some items shown separately in FIG. 4 could be implemented on individual computer systems and single items could be implemented by one or more computer systems. The actual number of computers used to implement each of the operations, databases, or file storage systems, and how features are allocated among them will vary from one implementation to another, and may depend in part on the amount of data at each instance, the amount of data traffic that an instance must handle during peak usage periods, as well as the amount of data traffic that an instance must handle during average usage periods.

To provide faster responses to clients and to provide fault tolerance, each program or process that runs at an instance is generally distributed among multiple computers. The number of instance servers 400 assigned to each of the programs or processes can vary, and depends on the workload. FIG. 5 provides exemplary information about a typical number of instance servers 400 that are assigned to each of the functions. In some embodiments, each instance has about 10 instance servers performing (502) as blobmasters. In some embodiments, each instance has about 100 instance servers performing (504) as bitpushers. In some embodiments, each instance has about 50 instance servers performing (506) as BigTable servers. In some embodiments, each instance has about 1000 instance servers performing (508) as file system servers. File system servers store data for file system stores 216 as well as the underlying storage medium for BigTable stores 214. In some embodiments, each instance has about 10 instance servers performing (510) as tape servers. In some embodiments, each instance has about 5 instance servers performing (512)

as tape masters. In some embodiments, each instance has about 10 instance servers performing (514) replication management, which includes both dynamic and background replication. In some embodiments, each instance has about 5 instance servers performing (516) as quorum clock servers.

Life of an Object

Figure 6A:
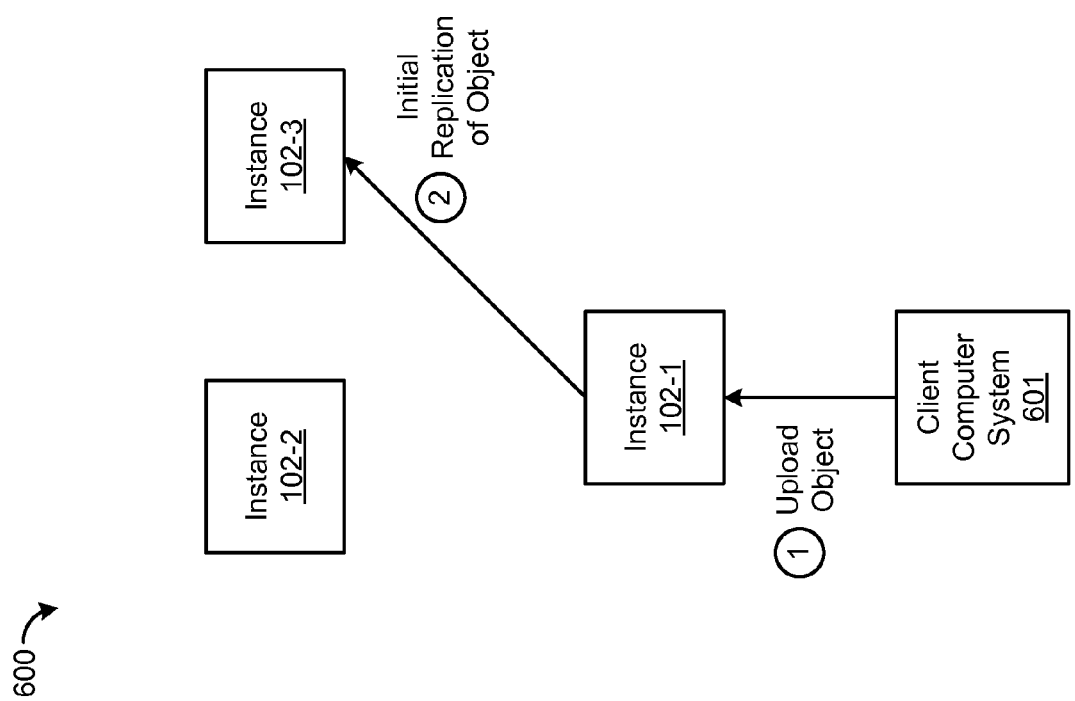
FIG. 6A is a block diagram illustrating the creation and the initial replication of an object, according to some embodiments.
Figure 6B:
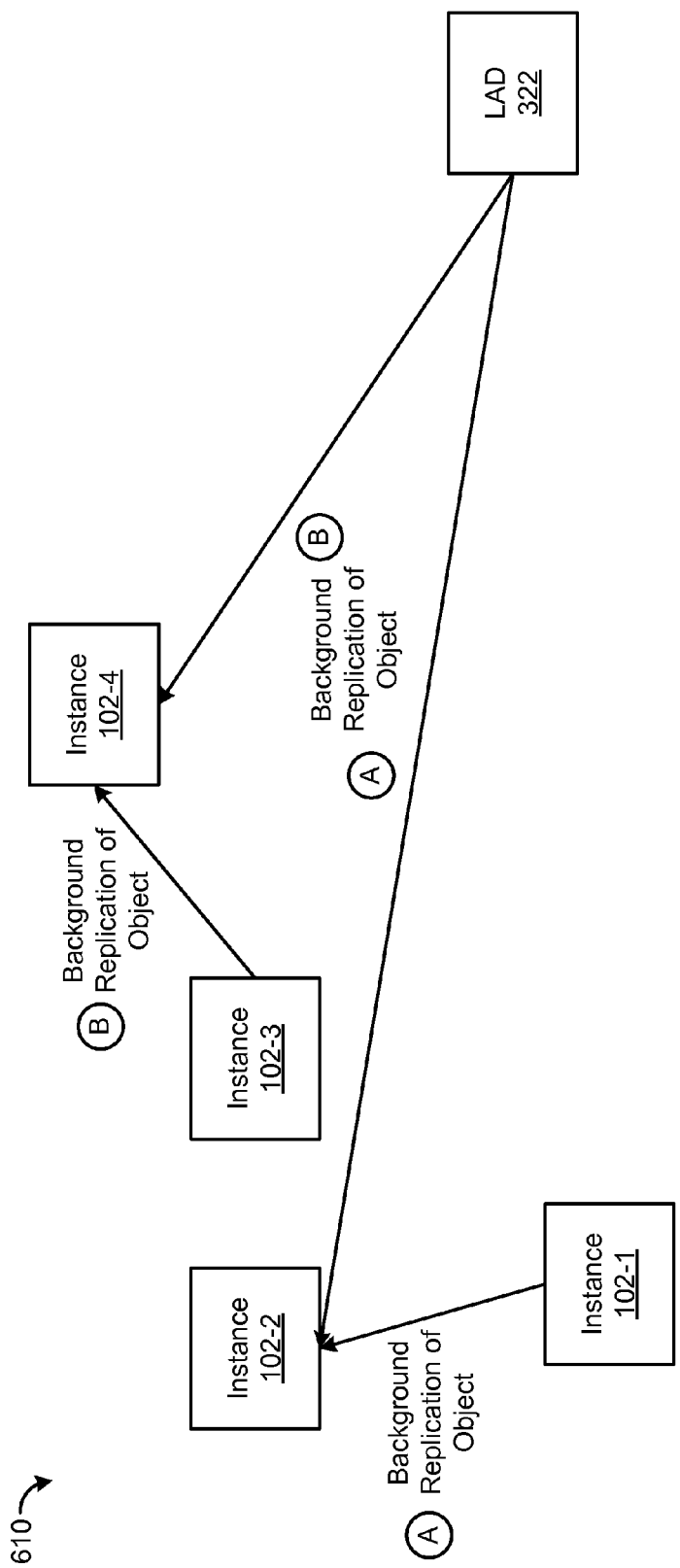
FIG. 6B is a block diagram illustrating the background replication of the object, according to some embodiments.

FIGS. 6A-6D present block diagrams 600, 610, 620, and 630 illustrating an exemplary sequence of events in the life of an exemplary object in the distributed storage system 200, according to some embodiments. In FIG. 6A, a client computer system 601 uploads (1) an object to instance 102-1 of the distributed storage system 200. In order to ensure data integrity, an initial replication of the object (2) is performed. In this example, a replica of the object is created in instance 102-3 of the distributed storage system 200.

Some time later, the location assignment daemon 322 initiates background replication (A, B) of the object based on replication policies for the object. The location assignment daemon 322 generates a replication request based on the policies for the object. The replication policies specify, among other things, a minimum and/or a maximum number of replicas of the object to be maintained in the distributed storage system 200. The replication request for the object includes a priority that is used when inserting the replication request into a replication queue 226 (i.e., a priority queue). In this example, replicas of the object are stored in instances 102-2 and 102-4 of the distributed storage system. The location assignment daemon 322 is described in more detail in co-pending U.S. Provisional Patent Application No. 61/302,936, filed Feb. 9, 2010, subsequently filed as U.S. patent application Ser. No. 13/022,290, filed Feb. 7, 2011, "System and Method for Managing Replicas of Objects in a Distributed Storage System," which is incorporated herein by reference in its entirety.

Figure 6C:
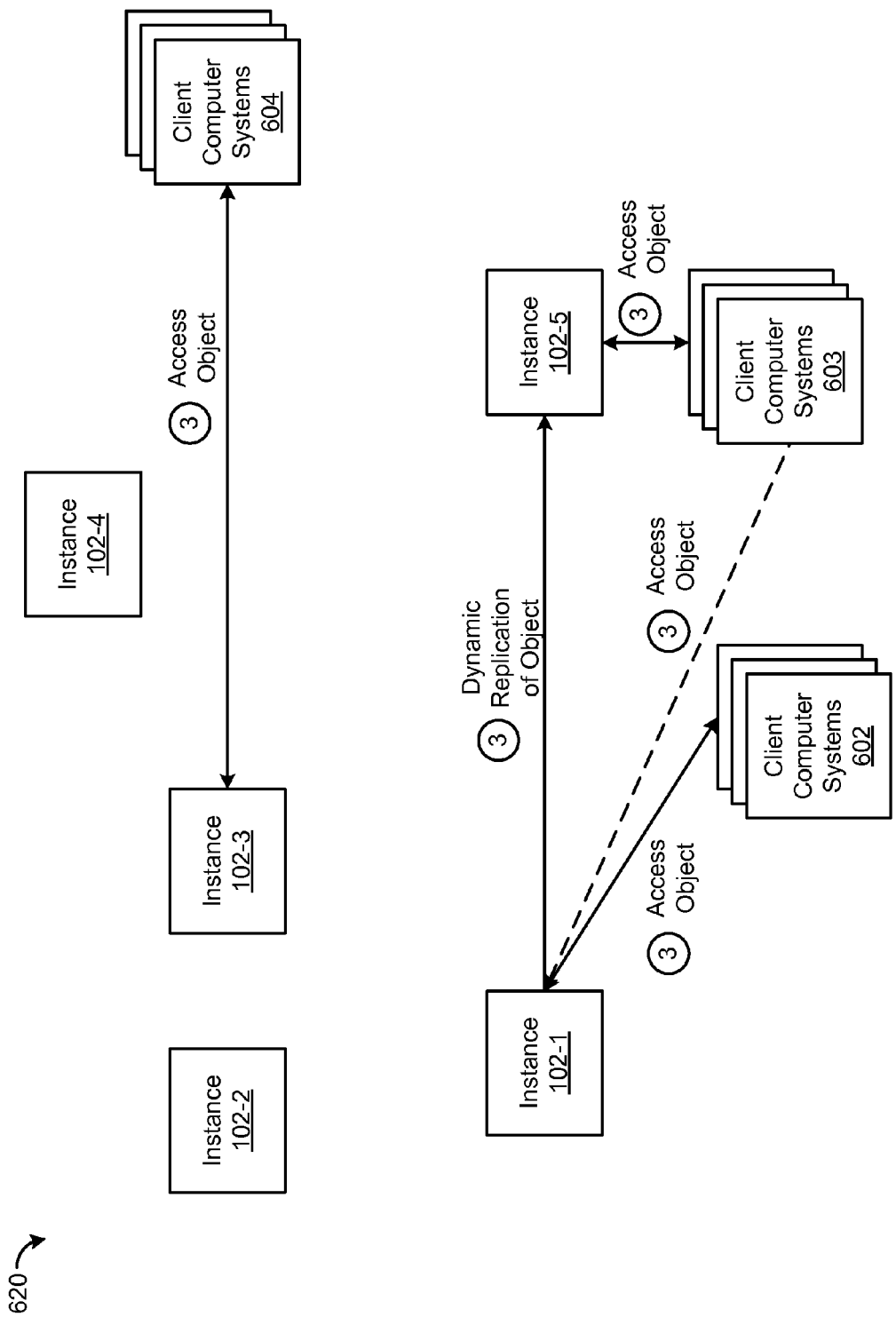
FIG. 6C is a block diagram illustrating a dynamic replication of the object, according to some embodiments.

At some point in time (either before or after the events illustrated in FIG. 6B), the object experiences a large demand. For example, client computer systems 602, 603, and 604 may request (3) access to the object. If the demand for the object exceeds the current capacity of a particular instance of the distributed storage system, a dynamic replication of the object (3) is performed in which a replica of the object is created in one or more instances. In this example, a replica of the object is created in instance 102-5 of the distributed storage system. A subset of the requests for the object are then redirected to the instance 102-5 as illustrated in FIG. 6C. Note that a dynamic replication of the object may also be performed to reduce the network latency between the client computer systems attempting to access the object and the instance at which the object is located. For example, if the replicas of the object are initially located in instances of the distributed storage system 200 within the United States, but there is a large demand for the object from Japan, replicas of the object may be created in instances of the distributed storage system 200 that located are within Japan.

Figure 6D:
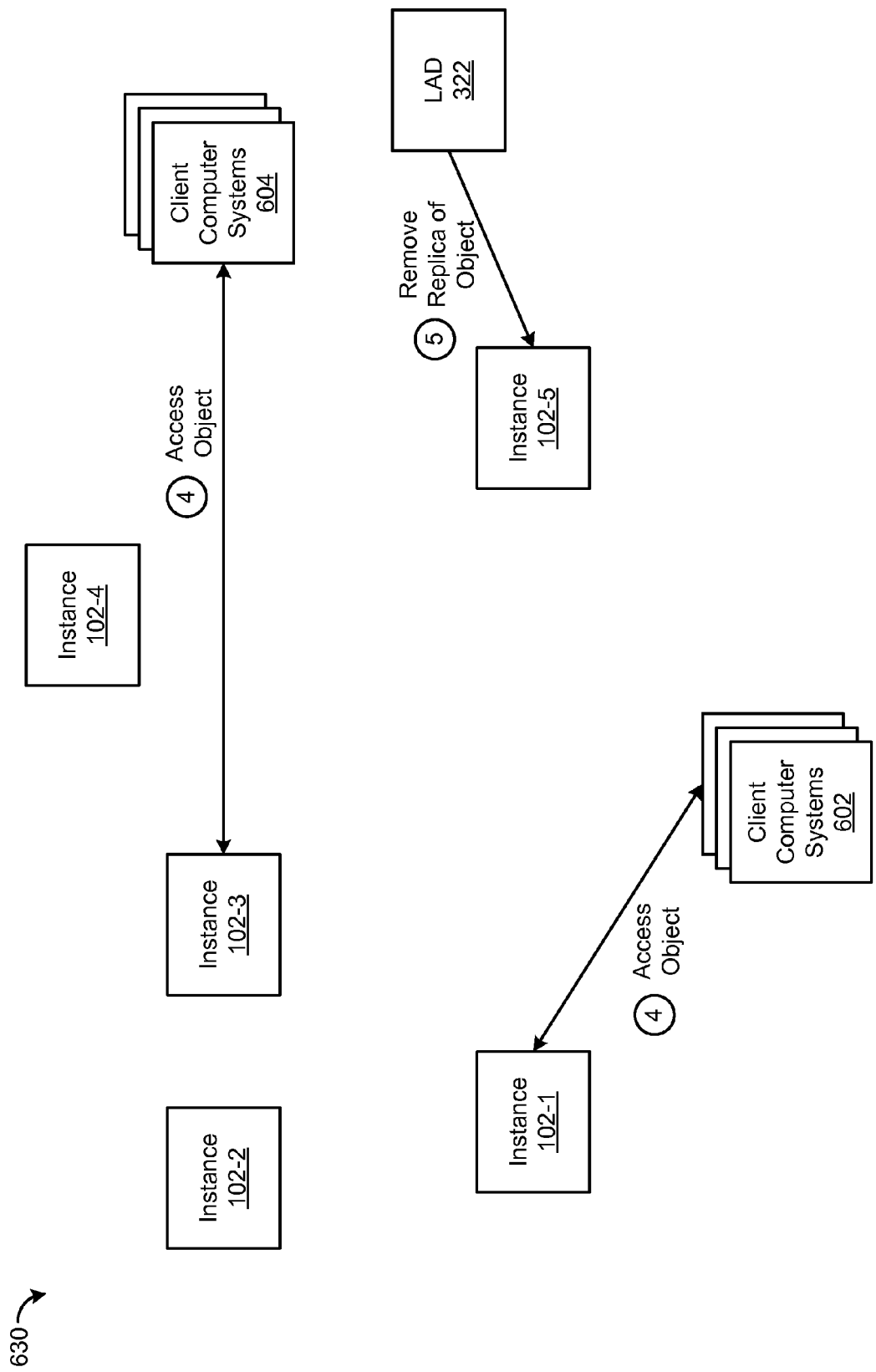
FIG. 6D is a block diagram illustrating the removal of a replica of the object, according to some embodiments.

Dynamic replication requests may increase the number of replicas of the object beyond a number allowed by the replication policies for the object. When the demand of an object decreases (e.g., only client computer systems 602 and 604 are still requesting the object), replicas of the object that exceed the replication policies for the object may be removed. In these cases, the location assignment daemon 322 removes (5) the extra replicas of the object when it has been determined that the extra replicas of the object are no longer needed (e.g., demand for the object has decreased), as illustrated in FIG. 6D.

Priority Queue

As discussed above, a priority queue may be used to maintain a list of prioritized objects. In order to address the deficiencies of existing priority queues, some embodiments provide a priority queue that is scalable and that can reside in the main memory (e.g., RAM) of a computer system (or server). In these embodiments, the priority queue (or elements of the priority queue) is stored in a distributed database. One such distributed database is a BigTable. Furthermore, the priority queue is partitioned into a plurality of queues in which only a subset of elements of the priority queue is handled by a computer system (e.g., a subset that fits in the main memory of a computer system).

Figures 7, 8:
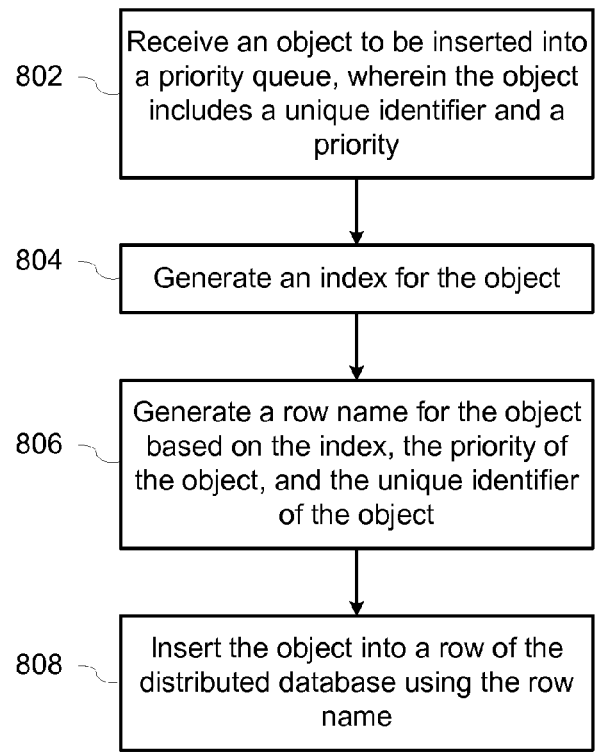
FIG. 7 is a block diagram illustrating an exemplary data structure for a row name in the distributed storage system, according to some embodiments.
FIG. 8 is a flowchart of a method for inserting an object into a distributed database, according to some embodiments.

In order to efficiently scan out and sort elements of the priority queue, some embodiments store the elements of the priority queue into the distributed database using a row name that indicates the priority of the element. FIG. 7 is a block diagram 700 illustrating an exemplary data structure for a row name in the distributed storage system, according to some embodiments. The row name includes an index 701 that allows the distributed database to identify a particular group of elements (e.g., a particular priority queue sharing similar parameters), a priority 702 that indicates the priority of the element, and an identifier 703 of the element. The use of this data structure is described in more detail below. The row names also have the property that when row names having a particular index 701 are sorted in lexicographic order, the row names are sorted in priority order.

Note that FIGS. 8-11 is described with respect to the replication module 224 for the sake of clarity. However, it is noted that any computer system or module may perform the operations described with respect to FIGS. 8-11.

FIG. 8 is a flowchart of a method 800 for inserting an object into a distributed database, according to some embodiments. The replication module 224 receives (802) an object to be inserted into a priority queue, wherein the object includes a unique identifier and a priority. In some embodiments, the object is a replication request to replicate data in a distributed storage system. In some embodiments, the unique identifier is an identifier of a particular replication request.

Next, the replication module 224 generates (804) an index for the object. In some embodiments, the index is generated by applying a hashing function to the unique identifier of the object. In some embodiments, the hashing function is selected from the group consisting of SHA-1 and MD5. In some embodiments, the index is a shard index.

The replication module 224 then generates (806) a row name for the object based on the index, the priority of the object, and the unique identifier of the object, wherein a lexicographical order of the row name for a higher priority object is smaller than the lexicographical order of the row name for a lower priority object.

Figure 9:
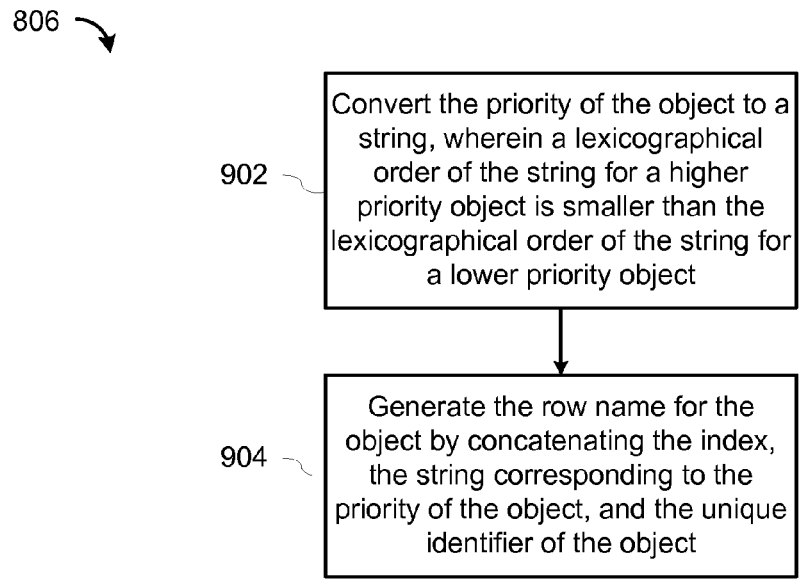
FIG. 9 is a flowchart of a method for generating the row name for the object based on the index and the priority of the object, according to some embodiments.

Attention is now directed to FIG. 9, which is a flowchart of a method for generating (806) the row name for the object based on the index and the priority of the object, according to some embodiments. The replication module 224 converts (902) the priority of the object to a string, wherein a lexicographical order of the string for a higher priority object is smaller than the lexicographical order of the string for a lower priority object. The replication module 224 then generates (904) the row name for the object by concatenating the index, the string corresponding to the priority of the object, and the unique identifier of the object.

Returning to FIG. 8, replication module 224 inserts (808) the object into a row of the distributed database using the row name.

To explain the processes of FIGS. 8 and 9, consider the following example. Assume that there is only one shard index (i.e., shard index "0"), the priority is represented as an integer between 0 and 999 (0 is the highest priority), and there are two elements with unique identifiers "id1" and "id2" with corresponding and priorities 34 and 7, respectively. The row name corresponding to the first element is "0:034:id1" and the row name corresponding to the second element is "0:007:id2." Note that zeros are prepended to the actual priority in order to ensure the increasing lexicographic order. When the distributed database is scanned and sorted for shard "0," the second element is returned first.

Figure 10:
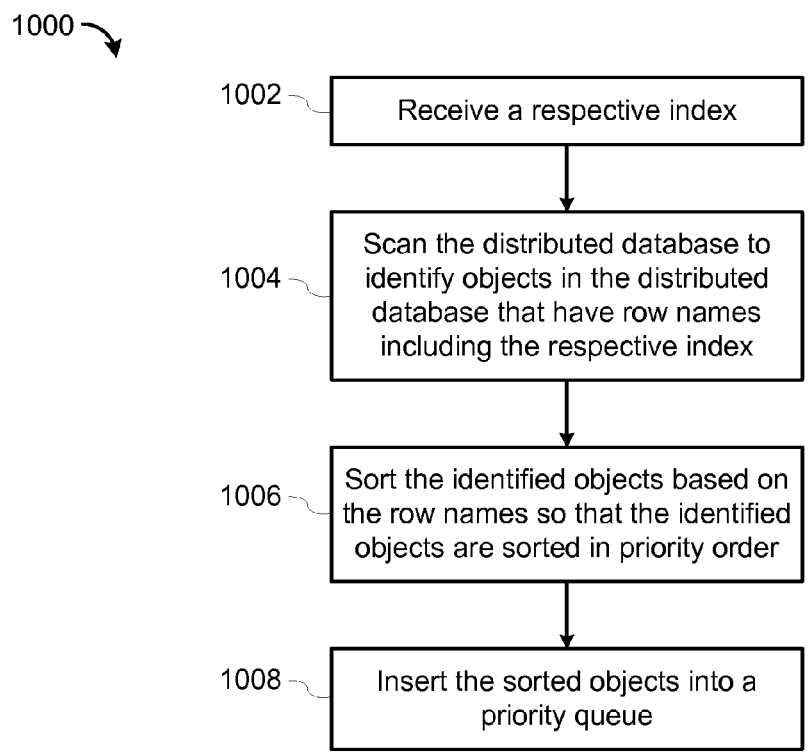
FIG. 10 is a flowchart of a method for inserting objects into a priority queue, according to some embodiments.

After objects are stored into the distributed database, the objects may then be retrieved, sorted in priority order, and inserted into a priority queue. FIG. 10 is a flowchart of a method 1000 for inserting objects into a priority queue, according to some embodiments. The replication module 224 receives (1002) a respective index and scans (1004) the distributed database to identify objects in the distributed database that have row names including the respective index. The replication module 224 then sorts (1006) the identified objects based on the row names so that the identified objects are sorted in priority order and inserts (1008) the sorted objects into a priority queue. In some embodiments, the priority queue is a replication queue.

Figure 11:
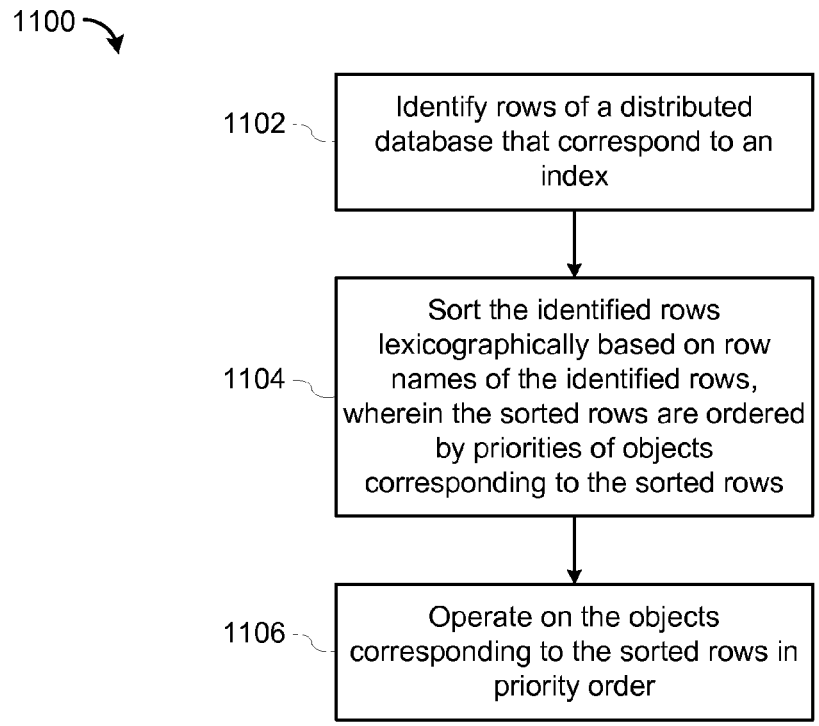
FIG. 11 is a flowchart of a method for operating on objects stored in a distributed database in priority order, according to some embodiments.

Objects in the distributed database (or in a priority queue) may then be operated on in priority order. FIG. 11 is a flowchart of a method 1100 for operating on objects stored in a distributed database in priority order, according to some embodiments. The replication module 224 identifies (1102) rows of a distributed database that correspond to an index. For example, the replication module 224 identifies rows of the distributed database that correspond to shard index 0. Next, the replication module 224 sorts (1104) the identified rows lexicographically based on row names of the identified rows, wherein the sorted rows are ordered by priorities of objects corresponding to the sorted rows.

The replication module 224 then operates (1106) on the objects corresponding to the sorted rows in priority order. In some embodiments, the objects are replication requests for replicating data in a distributed storage system. In these embodiments, replication module 224 executes the replication requests in priority order to replicate data in the distributed storage system.

In some embodiments, the distributed storage system includes a plurality of tablet servers. Note that a tablet server is database server that is responsible for a specific range of rows in a distributed database. A distributed database typically includes a multiplicity of tablet servers, each of which is responsible for a predetermined range of rows of the distributed database. In some embodiments, the distributed database is a BigTable. In some embodiments, a respective tablet server in the plurality of tablet servers operates on respective objects corresponding to a respective index.

Replicating Objects in a Distributed Storage System

Figure 12:
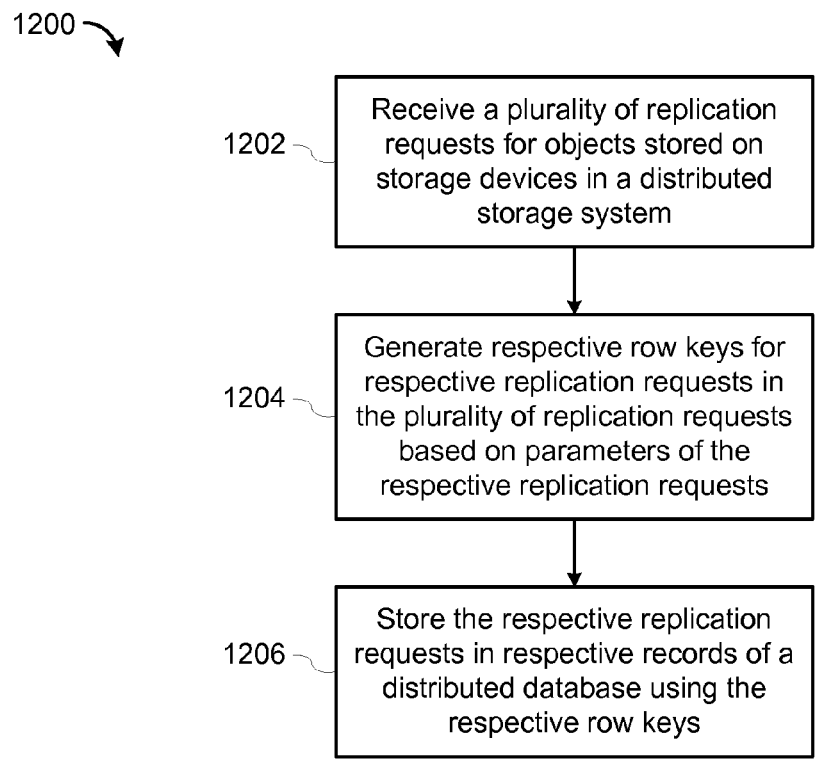
FIG. 12 is a flowchart of a method for storing replication requests for objects in a distributed storage system, according to some embodiments.
Figure 13:
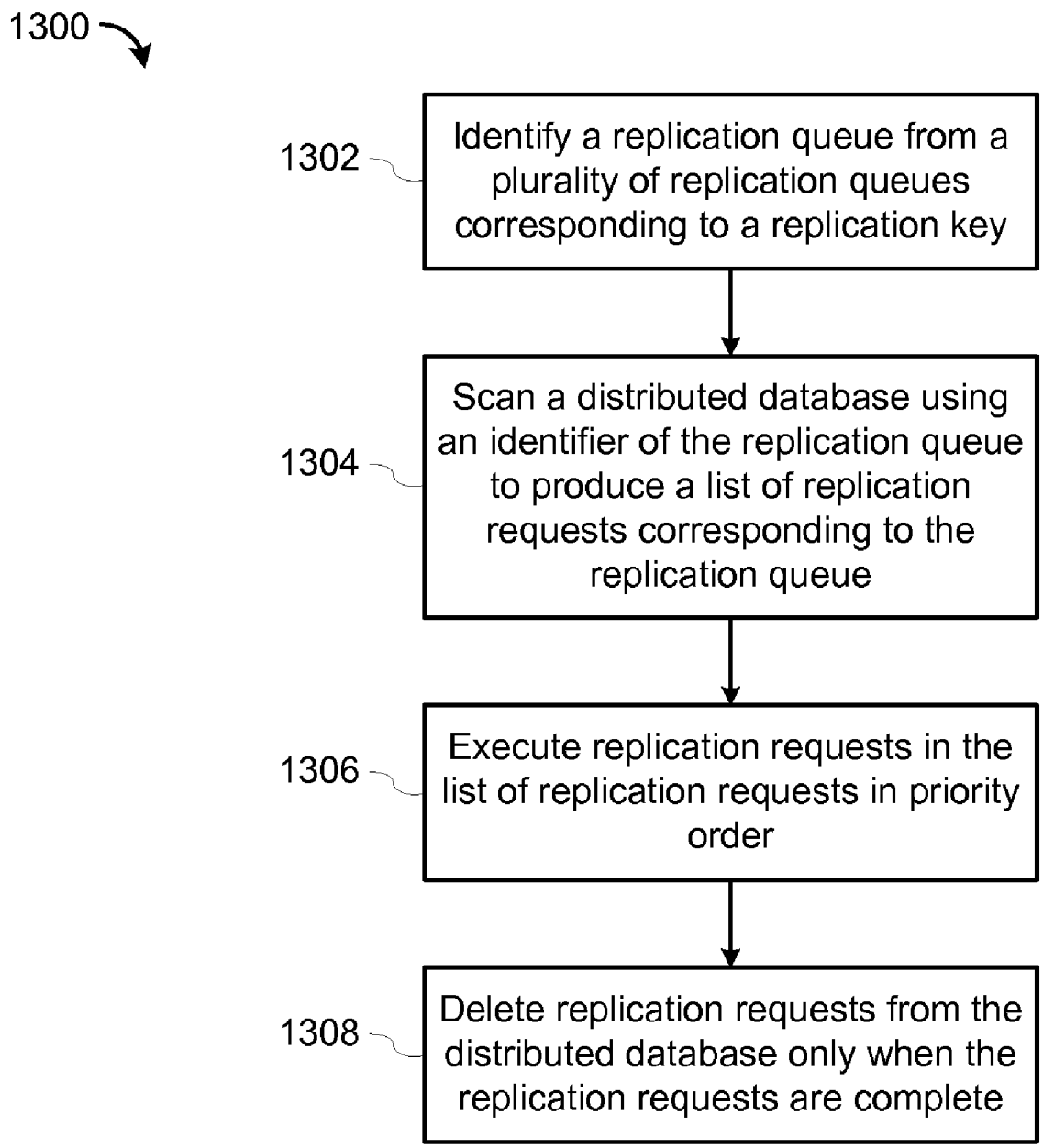
FIG. 13 is a flowchart of a method for executing replication requests for objects in a distributed storage system, according to some embodiments.
Figure 14:
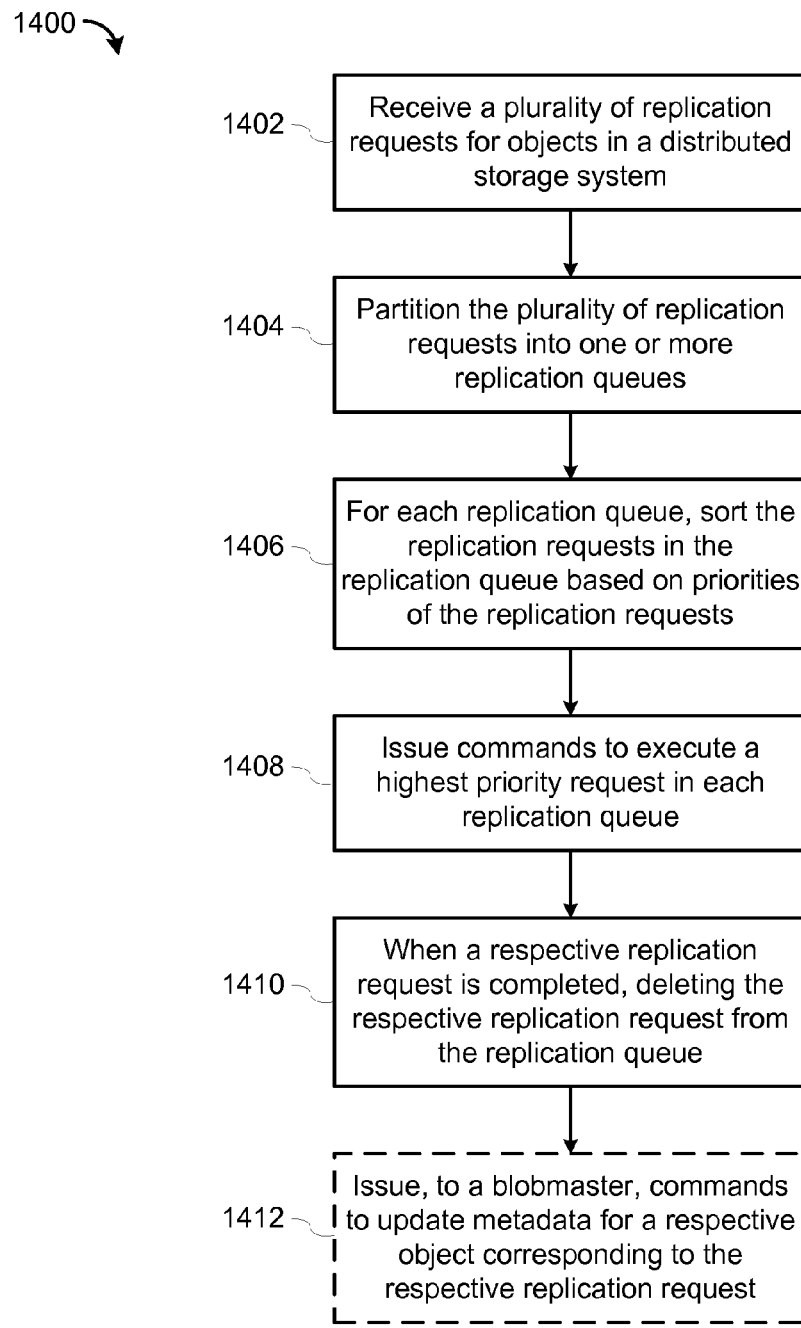
FIG. 14 is a flowchart of another method for executing replication requests for objects in a distributed storage system, according to some embodiments.

FIGS. 12-14 discuss embodiments in which the priority queue described above is used when replicating objects in the distributed storage system 200.

FIG. 12 is a flowchart of a method 1200 for storing replication requests for objects in a distributed storage system, according to some embodiments. The replication module 224 receives (1202) a plurality of replication requests for objects stored on storage devices in a distributed storage system. In some embodiments, a respective object is a binary large object (blob).

In some embodiments, the plurality of replication requests is received from a location assignment daemon (e.g., the location assignment daemon 322) is configured to generate replication requests globally across instances of the distributed storage system based at least in part on a current state of the distributed storage system and replication policies for objects in the distributed storage system. In some embodiments, the location assignment daemon is located on a computer system that is separate and distinct from a computer system that includes the replication module 224.

In some embodiments, a respective replication request is executable to add a replica of the respective object at an instance of the distributed storage system.

Next, the replication module 224 generates (1204) respective row keys (e.g., a row name) for respective replication requests in the plurality of replication requests based on parameters of the respective replication requests, wherein the respective row keys include respective globally-determined priorities for the respective replication requests that facilitate sorting of the respective replication requests by priority. In some embodiments, a globally-determined priority of the respective replication request is based on the globally-determined profit value for the respective replication request.

In some embodiments, the parameters for a respective replication request include a replication key corresponding to a respective object, a list of chunks of the respective object, a replication identifier corresponding to the respective replication request, and a globally-determined profit value corresponding to the respective replication request, wherein the globally-determined profit value is based on a metric corresponding to a benefit of performing the respective replication request minus a metric corresponding to a cost of performing the respective replication request.

In some embodiments, a respective row key for the respective replication request is generated based on the replication key of the respective replication request, the profit value of the respective replication request, and the replication identifier of the respective replication request.

In some embodiments, a respective row key for the respective replication request is generated based on a hashed version of the replication key of the respective replication request, the profit value of the respective replication request, and the replication identifier of the respective replication request. Hashing the replication key allows for further partitioning of a particular replication key (i.e., a replication queue) onto a plurality of task servers to distribute the load of executing the replication requests.

In some embodiments, the replication key includes a user identifier (e.g., an application, an end-user), a quality of service metric, an identifier for a source storage device in the distributed storage system, and an identifier for a destination storage device in the distributed storage system. In some embodiments, the source storage device and the destination storage device are located in separate and distinct instances of the distributed storage system.

The replication module 224 then stores (1206) the respective replication requests in respective records of a distributed database using the respective row keys, wherein the respective records of the distributed database are distributed across a plurality of nodes of the distributed database.

In some embodiments, steps 1202, 1204, and 1206 are performed at a respective instance of the distributed storage system. In some embodiments, the distributed storage system includes a plurality of instances of the distributed storage system.

After the replication requests are stored in the distributed storage system (e.g., the distributed database of the distributed storage system 200), the replication requests can then be executed in priority order. FIG. 13 is a flowchart of a method

1300 for executing replication requests for objects in a distributed storage system, according to some embodiments. The replication module 224 identifies (1302) a replication queue from a plurality of replication queues corresponding to a replication key (e.g., a particular replication queue from the replication queue 226), wherein the replication key includes information related to at least a source storage device in a distributed storage system at which objects are located and a destination storage device in the distributed storage system to which the objects are to be replicated. In some embodiments, replication requests in the replication queue have the same replication key.

As discussed above, a replication key includes a user identifier, a quality of service metric, an identifier for a source storage device in the distributed storage system, and an identifier for a destination storage device in the distributed storage system. Grouping replication requests by common a source storage device and a destination storage device ensures that a large replication request to replicate an object between a particular source storage device and a particular destination storage device does not block other replication requests to replicate objects between other source storage devices and destination storage devices. The addition of the user identifier provides further granularity by allowing particular replication requests to be grouped by users (e.g., applications). For example, replication requests to replicate objects for the same source and destination storage devices can be placed into separate replication queues based on the user (or application) associated with the objects. Thus, replication requests for objects associated with a video application can be separated from replication requests for objects associated with an email application, where both sets of replication requests are directed to the same source and destination storage devices. The replication requests in each of these replication queues are then executed in priority order. The addition of the quality of service metric allows further granularity by allowing particular replication requests to be executed before others based on the requested quality of service for the replication request. For example, consider a plurality of replication requests having the same source and destination storage devices. Furthermore, assume that one of the replication requests in the plurality of replication requests has a higher quality of service metric than the rest of the replication requests. In this case, the replication request with the higher quality of service request is placed in a first replication queue and the rest of the replication requests are placed in a second replication queue. Whereas the replication requests in the second replication queue are executed one at a time based on their respective priorities, the replication request in the first replication queue is the only replication request in the first replication queue, and therefore is executed immediately by the first replication queue.

Next, the replication module 224 scans (1304) a distributed database using an identifier of the replication queue to produce a list of replication requests corresponding to the replication queue, wherein the list of replication requests is sorted by globally-determined priorities of the replication requests that are included in row keys corresponding to records of the distributed database for the replication requests in the list of replication requests, and wherein the records of the distributed database are distributed across a plurality of nodes of the distributed database. In some embodiments, the identifier for the replication queue is a replication key.

The replication module 224 then executes (1306) replication requests in the list of replication requests in priority order. In some embodiments, the replication module 224 executes (1306) the replication requests corresponding to the replication queue in priority order by transmitting the replication requests to a task server for execution, wherein the task server is separate and distinct from a computer system including the replication module 224. Note that an instance 102 of the distributed storage system may include any number of task (or tablet) servers (not illustrated in FIG. 3) for executing the replication requests.

The replication module 224 deletes (1308) replication requests from the distributed database only when the replication requests are complete.

In some embodiments, steps 1302 to are performed for each replication queue in the plurality of replication queues.

FIG. 14 is a flowchart of another method 1400 for executing replication requests for objects in a distributed storage system, according to some embodiments. The replication module 224 receives (1402) a plurality of replication requests for objects in a distributed storage system.

Next, the replication module 224 partitions (1404) the plurality of replication requests into one or more replication queues, wherein a respective replication queue includes replication requests that have a respective replication key, wherein the respective replication key includes information related to at least a respective source storage device at which a respective object is located and a respective destination storage device to which the respective object is to be replicated. In some embodiments, the replication key also includes a respective user identifier and a respective quality of service metric.

For each replication queue, the replication module 224 sorts (1406) the replication requests in the replication queue based on priorities of the replication requests.

The replication module 224 issues (1408) commands to execute a highest priority request in each replication queue.

When a respective replication request is completed, the replication module 224 deletes (1410) the respective replication request from the replication queue.

In some embodiments, the replication module 224 issues (1412), to a blobmaster, commands to update metadata for a respective object corresponding to the respective replication request, wherein the blobmaster is configured to maintain metadata for objects in the distributed storage system. In some embodiments, the commands are issued to a bitpusher module configured to copy chunks of objects from source storage devices to destination storage devices. In some embodiments, the bitpusher module is located on a computer system that is separate and distinct from the computer system including the replication module 224.

In some embodiments, steps 1408 and 1410 are repeated for each replication queue until the replication queue is empty.

In some embodiments, steps 1408 and 1410 are repeated for each replication queue until a plurality of new replication requests is received from the location assignment daemon.

In some embodiments, each replication queue is handled by a respective task server that is separate and distinct from the computer system.

The methods 800, 806, 1000, 1100, 1200, 1300, and 1400 may be governed by instructions that are stored in a computer readable storage medium and that are executed by one or more processors of one or more servers. Each of the operations shown in FIGS. 8-14 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted and/or executable by one or more processors.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for storing replication requests for objects in a distributed storage system, comprising:
   at a computer system including one or more processors and memory storing one or more programs, for execution by the one or more processors:
      receiving a plurality of replication requests for objects stored on storage devices in a distributed storage system;
      generating respective row keys for respective replication requests in the plurality of replication requests based on parameters of the respective replication requests, wherein the respective row keys include respective globally-determined priorities for the respective replication requests that facilitate sorting of the respective replication requests by priority; and
      storing the respective replication requests in respective records of a distributed database using the respective row keys, wherein the respective records of the distributed database are distributed across a plurality of nodes of the distributed database,
   wherein the plurality of replication requests is received from a location assignment daemon that is configured to generate replication requests globally across instances of the distributed storage system based at least in part on a current state of the distributed storage system and replication policies for objects in the distributed storage system.

2. The method of claim 1, wherein the parameters for a respective replication request include:
   a replication key corresponding to a respective object;
   a list of chunks of the respective object;
   a replication identifier corresponding to the respective replication request; and
   a globally-determined profit value corresponding to the respective replication request, wherein the globally-determined profit value is based on a metric corresponding to a benefit of performing the respective replication request minus a metric corresponding to a cost of performing the respective replication request.

3. The method of claim 2, wherein a respective row key for the respective replication request is generated based on the replication key of the respective replication request, the profit value of the respective replication request, and the replication identifier of the respective replication request.

4. The method of claim 2, wherein a respective row key for the respective replication request is generated based on a hashed version of the replication key of the respective replication request, the profit value of the respective replication request, and the replication identifier of the respective replication request.

5. The method of claim 2, wherein the replication key includes:
   a user identifier;
   a quality of service metric;
   an identifier for a source storage device in the distributed storage system; and
   an identifier for a destination storage device in the distributed storage system.

6. The method of claim 2, wherein a globally-determined priority of the respective replication request is based on the globally-determined profit value for the respective replication request.

7. The method of claim 1, wherein the location assignment daemon is located on a second computer system that is separate and distinct from the computer system.

8. The method of claim 1, wherein a respective replication request is executable to add a replica of the respective object at an instance of the distributed storage system.

9. A system for storing replication requests for objects in a distributed storage system, comprising:
   one or more processors;
   memory; and
   one or more programs stored in the memory, the one or more programs comprising instructions to:
      receive a plurality of replication requests for objects stored on storage devices in a distributed storage system;
      generate respective row keys for respective replication requests in the plurality of replication requests based on parameters of the respective replication requests, wherein the respective row keys include respective globally-determined priorities for the respective replication requests that facilitate sorting of the respective replication requests by priority; and
      store the respective replication requests in respective records of a distributed database using the respective row keys, wherein the respective records of the distributed database are distributed across a plurality of nodes of the distributed database,
   wherein the plurality of replication requests is received from a location assignment daemon that is configured to generate replication requests globally across instances of the distributed storage system based at least in part on a current state of the distributed storage system and replication policies for objects in the distributed storage system.

10. The system of claim 9, wherein the parameters for a respective replication request include:
    a replication key corresponding to a respective object;
    a list of chunks of the respective object;
    a replication identifier corresponding to the respective replication request; and
    a globally-determined profit value corresponding to the respective replication request, wherein the globally-determined profit value is based on a metric corresponding to a benefit of performing the respective replication request minus a metric corresponding to a cost of performing the respective replication request.

11. The system of claim 10, wherein a respective row key for the respective replication request is generated based on the replication key of the respective replication request, the profit value of the respective replication request, and the replication identifier of the respective replication request.

12. The system of claim 10, wherein a respective row key for the respective replication request is generated based on a hashed version of the replication key of the respective replication request, the profit value of the respective replication request, and the replication identifier of the respective replication request.

13. The system of claim 10, wherein the replication key includes:
   a user identifier;
   a quality of service metric;
   an identifier for a source storage device in the distributed storage system; and
   an identifier for a destination storage device in the distributed storage system.

14. The system of claim 10, wherein a globally-determined priority of the respective replication request is based on the globally-determined profit value for the respective replication request.

15. The system of claim 9, wherein the location assignment daemon is located on a second computer system that is separate and distinct from the computer system.

16. The system of claim 9, wherein a respective replication request is executable to add a replica of the respective object at an instance of the distributed storage system.

17. A non-transitory computer readable storage medium storing one or more programs configured for execution by a computer, the one or more programs comprising instructions to:
   receive a plurality of replication requests for objects stored on storage devices in a distributed storage system;
   generate respective row keys for respective replication requests in the plurality of replication requests based on parameters of the respective replication requests, wherein the respective row keys include respective globally-determined priorities for the respective replication requests that facilitate sorting of the respective replication requests by priority; and
   store the respective replication requests in respective records of a distributed database using the respective row keys, wherein the respective records of the distributed database are distributed across a plurality of nodes of the distributed database,
   wherein the plurality of replication requests is received from a location assignment daemon that is configured to generate replication requests globally across instances of the distributed storage system based at least in part on a current state of the distributed storage system and replication policies for objects in the distributed storage system.

18. The computer readable storage medium of claim 17, wherein the parameters for a respective replication request include:
   a replication key corresponding to a respective object;
   a list of chunks of the respective object;
   a replication identifier corresponding to the respective replication request; and
   a globally-determined profit value corresponding to the respective replication request, wherein the globally-determined profit value is based on a metric corresponding to a benefit of performing the respective replication request minus a metric corresponding to a cost of performing the respective replication request.

19. The computer readable storage medium of claim 18, wherein a respective row key for the respective replication request is generated based on the replication key of the respective replication request, the profit value of the respective replication request, and the replication identifier of the respective replication request.

20. The computer readable storage medium of claim 18, wherein a respective row key for the respective replication request is generated based on a hashed version of the replication key of the respective replication request, the profit value of the respective replication request, and the replication identifier of the respective replication request.

21. The computer readable storage medium of claim 18, wherein the replication key includes:
   a user identifier;
   a quality of service metric;
   an identifier for a source storage device in the distributed storage system; and
   an identifier for a destination storage device in the distributed storage system.

22. The computer readable storage medium of claim 18, wherein a globally-determined priority of the respective replication request is based on the globally-determined profit value for the respective replication request.

23. The computer readable storage medium of claim 17, wherein the location assignment daemon is located on a second computer system that is separate and distinct from the computer system.

24. The computer readable storage medium of claim 17, wherein a respective replication request is executable to add a replica of the respective object at an instance of the distributed storage system.

* * * * *